US012151612B2

(12) United States Patent  (10) Patent No.: US 12,151,612 B2
Engineer  (45) Date of Patent: Nov. 26, 2024

(54) AUTOMATED SYSTEM TO MONITOR AND RESTRICT HONKING

(71) Applicant: Satyen Engineer, Ahmedabad (IN)

(72) Inventor: Satyen Engineer, Ahmedabad (IN)

( * ) Notice: Subject to any disclaimer, the term of this patent is extended or adjusted under 35 U.S.C. 154(b) by 37 days.

(21) Appl. No.: 15/764,843

(22) PCT Filed: Sep. 30, 2016

(86) PCT No.: PCT/IN2016/050329
§ 371 (c)(1),
(2) Date: Mar. 29, 2018

(87) PCT Pub. No.: WO2017/056112
PCT Pub. Date: Apr. 6, 2017

(65) Prior Publication Data
US 2018/0281676 A1 Oct. 4, 2018

(30) Foreign Application Priority Data
Sep. 30, 2015 (IN) .......................... 3212/MUM/2015

(51) Int. Cl.
*B60Q 5/00* (2006.01)
*G06Q 20/12* (2012.01)
*H02J 1/00* (2006.01)

(52) U.S. Cl.
CPC ............... *B60Q 5/005* (2013.01); *B60Q 5/00* (2013.01); *G06Q 20/123* (2013.01); *H02J 1/00* (2013.01)

(58) Field of Classification Search
None
See application file for complete search history.

(56) References Cited

U.S. PATENT DOCUMENTS

| | | | |
|---|---|---|---|
| 2007/0080525 A1 | 4/2007 | Mauriello | |
| 2014/0005884 A1 | 1/2014 | Hampiholi | |
| 2015/0183369 A1* | 7/2015 | Fu | B60Q 5/00 |

FOREIGN PATENT DOCUMENTS

| | | |
|---|---|---|
| CN | 101618696 | 1/2010 |
| CN | 103042971 | 4/2013 |

(Continued)

OTHER PUBLICATIONS

International Search Report received in PCT/IN2016/050329, dated Mar. 9, 2017, 4 pages.

(Continued)

*Primary Examiner* — Jelani A Smith
*Assistant Examiner* — Melanie J Patrick
(74) *Attorney, Agent, or Firm* — Hayes Soloway P.C.

(57) ABSTRACT

An Automated System to Monitor and Restrict Honking (S) is provided for an automobile to reduce noise pollution. Said system mainly comprises of an on-board computing means (N) to be placed on the vehicle for monitoring and restricting honks in said vehicle; and an off-board computing means (F) further comprising a user element (FU) for user, a dealer element (FD) for dealer (FD) and a master element (FM) for centralized administration and controlling of the present System (S). Said system (S) provides pre-defined allowable honk counts to a user and once said allowable honk counts are exhausted, the on-board computing means (N) turns to partial enable state allowing only limited numbers of long press honking, exhausting which, the honking is disabled. Said system (S) enables restriction of needless honking including continuous and multiple honking. Present system (S) also has provision for recharge to start the honking again.

6 Claims, 13 Drawing Sheets

(56) References Cited

FOREIGN PATENT DOCUMENTS

| | | |
|---|---|---|
| CN | 103863180 | 6/2014 |
| EP | 1530114 | 5/2005 |
| EP | 2679447 | 1/2014 |
| IN | 3733/MUM/2013 | 2/2015 |
| WO | WO 2015125151 | 8/2015 |

OTHER PUBLICATIONS

Written Opinion of the International Searching Authority, from PCT/IN2016/050329, dated Apr. 6, 2017, 10 pages.

Singh, "Horn usage meter to make you pay for honking," *Mumbai Mirror*, India (Internet), Feb. 14, 2014, 5 pages.

"New Gadgets Hope to Help Hush Mumbai's Incessant Honking," *Gadget 360* (an NDTV venture), Mar. 26, 2014, https://gadgets.ndtv.com/others/features/new-gadgets-hoped-to-help-hush-mumbais-incessant-honking-500504, 5 pages.

"How noise pollution is affecting our health," *Zee News* (page links to video) Jun. 11, 2016, http://zeenews.india.com/news/videos/top-stories/how-noise-pollution-is-affecting-our-health_1894386.html, 4 pages.

"New gadgets hope to hush Mumbai's incessant honking," *The Hindu*, Mumbai, Mar. 27, 2014, http://www.thehindu.com/todays-paper/tp-in-school/new-gadgets-hope-to-hush-mumbais-incessant-honking/article5836600.ece, 3 pages.

"Shh . . . Traffic cops may soon monitor your honking," *DNA*, Feb. 14, 2014, http://www.dnaindia.com/mumbai/report-shh-traffic-cops-may-soon-monitor-your-honking-1961912, 7 pages.

"Mumbai: New gadgets hope to hush incessant honking," *NDTV*, Mar. 26, 2014, https://www.ndtv.com/mumbai-news/mumbai-new-gadgets-hope-to-hush-incessant-honking-555143, 3 pages.

"70% noise pollution due to honking," *The Times of India*, Jul. 30, 2013, 2 pages.

"Honking and using pressure horns is a big menace on our roads: Nitin Gadkari," *The Economic Times*, Aug. 16, 2016, 2 pages.

"Govt plans hefty fines for needless honking," *The Times of India*, Jun. 29, 2016, 2 pages.

* cited by examiner

AUTOMATED SYSTEM TO MONITOR AND RESTRICT HONKING

CROSS REFERENCE TO RELATED APPLICATIONS

This is the U.S. National Stage of International Application No. PCT/IN2016/050329 filed Sep. 30, 2016, which was published in English under PCT Article 21(2), which in turn claims the benefit of India Application No. 3212/MUM/2015, filed in India on Sep. 30, 2015. The prior applications are incorporated by reference herein in their entirety.

FIELD OF THE INVENTION

The present invention relates to An Automated System to Monitor and Restrict Honking for an automobile to reduce noise pollution.

More particularly, the present invention relates to An Automated System to Monitor and Restrict Honking which counts the honking usage of the user and restricts honking once it reaches a pre-defined count limit by disabling the honking. The present invention has a provision of recharging to start the honking again. The present invention restricts the honking in an automobile, is independent of automobile's location.

BACKGROUND OF THE INVENTION

With more and more urbanization, there is an increased concern of noise pollution. Noise pollution is the excessive noise that may harm the activity or balance of human or animal life. The source of most outdoor noise worldwide is mainly caused by machines and transportation systems including motor vehicles, aircraft, and trains.

High noise levels can contribute to Stress, hearing loss, cardiovascular effects in humans and an increased incidence of coronary artery disease. In animals, noise can increase the risk of death by altering predator or prey detection and avoidance, interfere with reproduction and navigation, and contribute to permanent hearing loss.

Documented problems associated with urban noise go back as far as Ancient Rome. Various studies show that the noise pollution caused by honking is a long felt concern. Few of the documented reports are enlisted as below:
 "It's been reported that around 70% of noise pollution in the urban areas is caused by just pointless honking" (70% noise pollution due to honking, TOI, Jul. 30, 2013)
 Loud horns are major concerns creating nuisance or menace on our roads ("Honking and using pressure horns is a big menace on our roads" The Economics Times, Aug. 16, 2016)

Said concerns of noise pollution by automobile honking are persistent since long.

Moreover, it is observed that there has been unnecessary honking or needless honking by certain people. They tend to honk continuously or honk for multiple times even when that is not needed. This defeats the purpose of providing horns which are for emergency and saves others from accidents when used. This misuse of honking systems can be termed as needless honking.

Trials are being made to control the concerns of noise pollution at least near some areas such schools, hospitals etc by declaring them silence zone. However, that has failed to achieve the solution for noise control within said areas also; as people tend not to follow the restriction of honking in said zones. Further, there are no provisions of surveillance for identifying and penalizing the people who honk in those areas.

Various inventors across the world tried to address the said problem at least in said silence zones. The inventions and their limitations are described in details herein below under the title "prior art". Said prior arts fail to achieve the objects of addressing problems of noise pollution even in the silence zones. Moreover, the overall problem of noise pollution in the urban areas remains persistent.

Various publications mentions that government is planning to bring strict actions against needless honking and to penalize the persons honking needlessly. Certain publications also mention that government is planning to impose heavy penalties on repeated offenders for needless honking. (Government plans hefty fines for needless honking, Rs 500/—fine for first time offence and Rs 1000/—for subsequent ones (TOI—Jun. 29, 2016)). Also, publications from various countries including Dubai, England, London and other mention abut such penalties and strict actions for the same.

However, there are no systems that can:
 recognize needless honks,
 identify the offender who is or who has done needless honking,
 identify the repeater of needless honking without human intervention i.e. intervention of police or other such authorities. However, in a country like India and such others, where there is such huge population, it is not possible to judge the needless honk in such huge traffic, even if the direction of incoming noise of the continuous or needless honk is traceable, it is difficult to identify the offender who is or who has done needless honking. Moreover, it is nearly impossible to find out whether the offender is the repeater of needless honking or not, in absence of any dedicated system. However, the prior arts have failed to provide any system that can solve said problems to control the noise pollution.

Thus, there is an unmet need to provide An Automated System to Monitor and Restrict Honking for an automobile to reduce noise pollution that can address the aforementioned problems.

PRIOR ART

Various systems have been devised to control honking in an automobile. Some of these systems are as described:

OREN, Mumbai (Details received from Z News Survey Jun. 10, 2016, OREN, New Gadgets Hope To Help Hush Mumbai's Incessant Honking, NDTV, Gadget 360, Mar. 14, 2014) device was devised as "horn usage meter" which allows honking for a limited amount of time after which it causes vehicle's tail lights to flash and alert the traffic police, who could then issue a challan. The driver of a vehicle with this system installed gets 3 hours of free honking and on completion can top up honk by payment. In addition, green amber and red light warnings over his honk allowance and can top up his meter like a prepaid phone card. The device is to be fitted on the dashboard of the car & has a keyboard & LCD display. There are keys provided on the keyboard meant to register the recharge wherein code obtained through scratch card or telephone. However, this device fails to restrict horn usage thereby fails to facilitate in noise pollution control. It can also cause disturbance to other drivers on the road with flashing tail-lights, also traffic police has to intervene for issuing challans. Further, said device is unfit for two wheelers and three wheelers. Many components makes device costly and make device consume more power. Moreover, said device is easily temperable and recharge method is also hackable. Furthermore, the honking restriction is not user friendly as the device measures honk on time factor and very few can estimate a good judgment of "time-period". Said time based functionality for horn usage estimation which is difficult to realize by driver. Said device is not based on any centralised system neither there is any mechanism that exist for tracking the drivers remotely that unnecessarily honk. In absence of said centralised system, there are no logs or analysis available to check the behaviour of users and thereby facilitate to improvise the law and infrastructure. In addition, the device is less versatile for universal implementation. The size and the design of said device may prevent the system to become OEM (Original Equipment Manufacturer). Said device can be duplicated as there is no provision of any method to the law enforcement authority where device authenticity is checked. In addition, the Installation process is complex because of too much wiring involved. The wiring is accessible to the user and can easily be tempered, so the implementation of the device is upon driver's will. Also, device wiring bypass is difficult to check and track. Thus, cannot ensure enforcement. Moreover, the device fails to facilitate hack free and corruption free system for honking management as collection of fines, recharge etc are vulnerable to corruption. Also, Recharge mechanism can be tempered and can lead to parallel economy. Because of both the defined recharge methods, system is highly dependent on unregistered cash flow.

Indian patent application number 3733MUM2013 relates to "System and method for facilitating reduction in honking and noise pollution caused by a vehicle". The purpose of device described in the specification is to function only within the "silence zone" as notified on the maps of the city. Said device alerts the user of the vehicle about "silence zone" approaching & when inside the zone it counts the number of horns used and also alerts the driver on exiting the "silence zone". For which, the device uses mobile maps and the GPS to detect vehicle position and notified "silence zone" in the city. This device only registers honks used inside "silence zone" and displays the same to the user. However, for the driver to know "silence zone" the device has to stay connected with mobile phone, it does not mute the horn inside the zone. In addition, maps need update to know any changes that happens to the silence zones. Additionally, "silence zones" are only about 3% to 5% of the total road area of the city. Thus, notifying the driver about the silence zone and about the honks used in the silence zone does not solve the problem of noise pollution caused due to honking. So, it fails to achieve the purpose of reduction in overall noise pollution.

The Chinese patent CN103863180 describes a system wherein 'vehicle body control module based no-horn control system' has two components namely, ground device which is set-up in a no-horn restriction zone and vehicle device which is set-up in the vehicle. The said system controls the volume of honk with the help of photoelectric sensor connected to a microprocessor and a signal emission module. When the vehicle enters in honking restricted area, the ground equipment perceives it with the help of photoelectric sensor and sends transmission signals to the vehicle device to shut-down honking in the restricted area. However, the said system does not record honking count and does not regulate the honking usage.

The Chinese patent CN103042971 describes an intelligent horn control system which recognizes the time interval information and control the sound and volume of horn according to the defined limits set for whistle control interval and whistle control area. The system thus control the volume and pitch of horn system. The functioning of the system is based on position, time and defined limit for the system. However, the said system fails to count number of honking and its duration.

The Chinese patent CN101618696 relates to a horn forbidding system wherein a radio transmitter is installed in a sound restriction area and simultaneously a controller is installed in the automobile. The horn control circuit receives radio signals from transmitter and forces the honking system to shut down in restricted zone. The decision making is dependent on external signals and based on the defined restricted zones and areas. However, the system is unable to count the number of honking and its duration. Further, it also fails to restrict honking independent of location.

The US patent US20140005884 describes a 'computer-implemented method' which disable the vehicle horn on specific location on the driver's route. When the driver reaches a honking restricted location on the route, one or more instructions may be transmitted by the vehicle computer to disable the horn. Thus, this system only restricts noise in limited location and not the entire area of the route. The system is unable to count number of honking and decision is based on signals received from defined location and areas.

In the systems developed so far, none of them have been successful in controlling excessive honking of an automobile independent of parameter of location. Therefore, none of them have been able to effectively reduce noise pollution.

Thus, there is an unmet need for An Automobile Restriction System whose main function is to restrict avoidable honking of an automobile by stopping the honking system completely in any given location after pre-defined honking count limit is reached and restarting only after recharging the system.

DISADVANTAGES OF THE PRIOR ART

The existing systems for restriction of honking, suffers from at least one of the following disadvantages:
1. They fail to facilitate in reduce noise pollution caused by automobile honking.
2. They fail to facilitate implementation of judicial laws of particular state or country.
3. Said systems fail to:
   recognize needless honks,
   identify the offender who is or who has done needless honking,
   identify the repeater of needless honking
4. Said systems are not temper proof, hack-proof and corruption proof systems of automobile noise control.
5. They fail to facilitate tracking & controlling honking without human interface making the present system corruption prone.
6. They fail to enable data collection of honking for analysis thereby generating a complete log of data useful for tracing each such installed system and its behavior and also useful for making noise pollution control law more stringent & frame other law based on data.
7. They fail to enable automatic and accurate identification (without human intervention) remotely by the system and thereby penalize only accurately identified errant automobile drivers; thereby facilitating the disciplining of behavior of general public with regards to honking.
8. They are big in size and thus are difficult to install in all types of existing automobile systems (especially two wheelers) and also failing to make it possible to provide as in-built system in future automobiles (OEM).
9. They fail to provide indication of indication that allowable horn counts are over and only pre fixed additional horn counts are available after which system is to disable honking.
10. They are costly and require maintenance.
11. They are complex yet inefficient.

OBJECTS OF THE PRESENT INVENTION

The main object of the present invention is to provide An Automated System to Monitor and Restrict Honking to reduce noise pollution caused by automobile honking.

Another object of the present invention is to provide An Automated System to Monitor and Restrict Honking that is based on pre-set permissible horn counts allowed as per the laws of the jurisdiction and disables the honking after pre-fixed repeated reminders.

Yet another object of the present invention is to provide An Automated System to Monitor and Restrict Honking that:
recognize needless honks,
identify the offender who is or who has done needless honking,
identify the repeater of needless honking Yet another object of the present invention is to provide An Automated System to Monitor and Restrict Honking that is temper proof, hack-proof and corruption proof system of automobile noise control.

Yet another object of the present invention is to provide An Automated System to Monitor and Restrict Honking which enables effective implementation of honking restriction related laws.

Yet another object of the present invention is to provide An Automated System to Monitor and Restrict Honking that enables tracking & controlling honking without human interface making the present system corruption proof.

Yet another object of the present invention is to provide An Automated System to Monitor and Restrict Honking that enables data collection of honking for analysis thereby generating a complete log of data useful for tracing each such installed system and its behavior and also useful for making noise pollution control law more stringent & frame other law based on data.

Yet another object of the present invention is to provide An Automated System to Monitor and Restrict Honking that enables automatic and accurate identification (without human intervention) remotely by the system and thereby penalize only accurately identified errant automobile drivers; thereby facilitating the disciplining of behavior of general public with regards to honking.

Yet another object of the present invention is to provide An Automated System to Monitor and Restrict Honking that is small in size making it easy to install in all types of existing automobile systems (including two wheelers) and also making it possible to provide as in-built system in future automobiles (OEM).

Yet another object of the present invention is to provide An Automated System to Monitor and Restrict Honking that has a provision for recharge, only for permissible times as per laws (preferably once).

Yet another object of the present invention is to provide An Automated System to Monitor and Restrict Honking that has provision of partial enable mode for use in emergency so that the purpose of providing horn is not defeated and user can use the horn in emergency.

Yet another object of the present invention is to provide An Automated System to Monitor and Restrict Honking which is free of maintenance.

Yet another object of the present invention is to provide An Automated System to Monitor and Restrict Honking which is economical.

Yet another object of the present invention is to provide An Automated System to Monitor and Restrict Honking which is easy (no special skills required to use the present system) and simple to use (provides flawless usage by user), yet is efficient.

Yet another object of the present invention is to provide An Automated System to Monitor and Restrict Honking to help Government raise money from culprit, for medical treatment of victim (patient) of noise pollution.

BRIEF DESCRIPTION OF DRAWINGS

FIG. 3C: Shows the Communication flowchart for the present Automated System to Monitor and Restrict Honking.
FIG. 4C: Flowchart showing working of master element of the off-board computing means of the present Automated System to Monitor and Restrict Honking.
Wherein:

MEANING OF REFERENCE NUMERALS OF SAID COMPONENT PARTS OF PRESENT INVENTION

Figure 1:
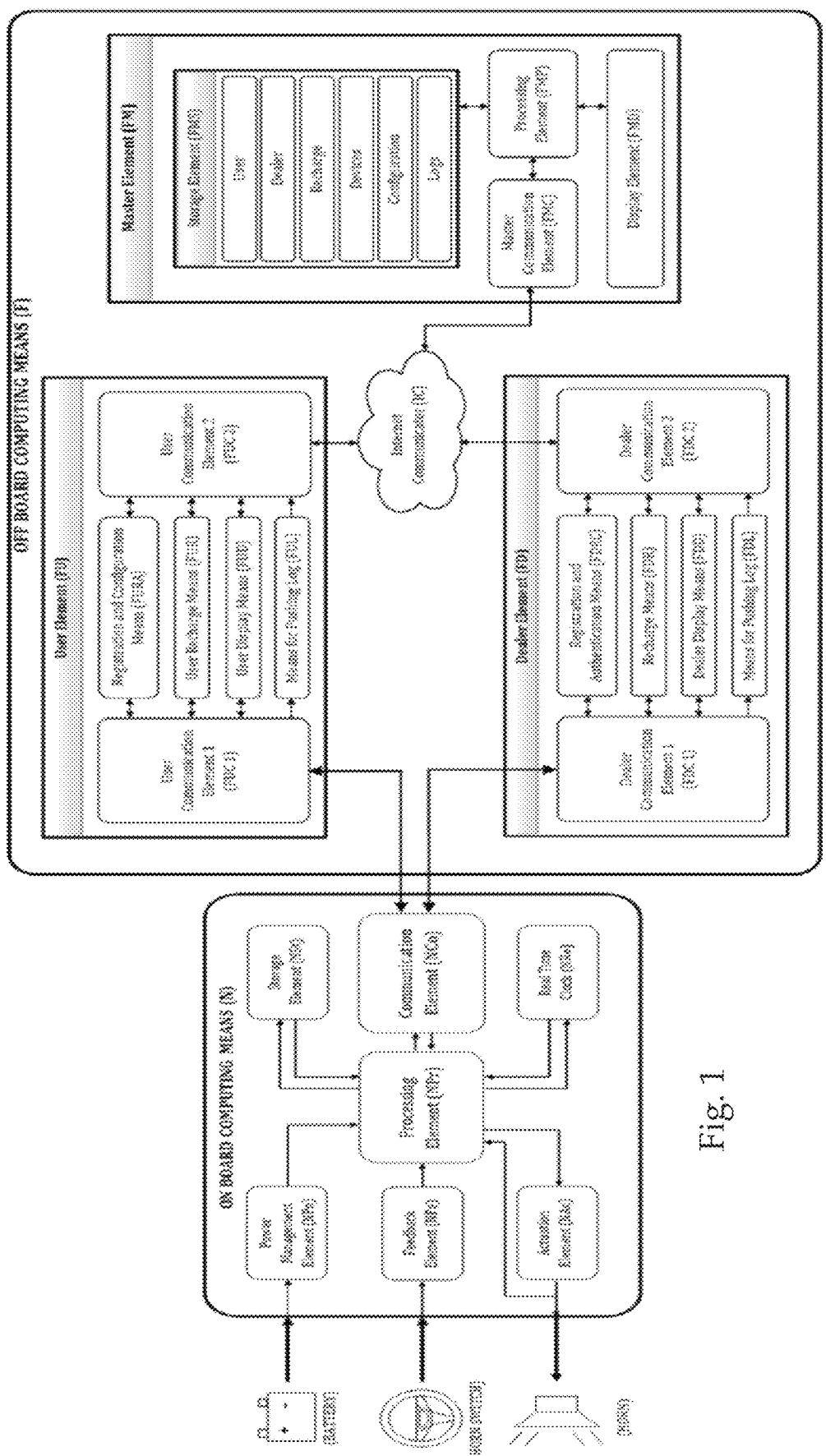
FIG. 1: Shows the block diagram of the present Automated System to Monitor and Restrict Honking.

S: Present Automated System to Monitor and Restrict Honking
N: On-board computing means
NPo: power management element
NAc: actuation element
NFe: feedback element
NPr: processing element
NSt: storage element NRe: real time clock
NCo: communication element
F: Off-board computing means
FM: Master Element
FMS: Master storage element
FMC: Master communication element
FMP: Master processing element
FMD: Master display element
FD: Dealer Element
FDRC: Dealer Registration and configuration means
FDR: Dealer Recharge means
FDD: Dealer Display means
FDL: Dealer means for pushing Log
FDC1: Dealer communication element 1
FDC2: Dealer communication element 2
FU: User Element
FURA: user registration and authentication means
FUR: user recharge means
FUD: user Display means
FUL: user means for pushing Log
FUC1: User communication element 1
FUC2: User communication element 2

DETAILED DESCRIPTION OF THE INVENTION

The embodiment of present invention is to provide An Automated System to Monitor and Restrict Honking (S) for an automobile to reduce noise pollution. Said system restricts honking in an automobile by disabling the honking once it reaches the pre-defined count limit for honking usage or once the allowable number of honks are used up. Said allowable number of honks per device or per vehicle shall include pre-set values including values defined by the judicial provisions of a state or a country. The present Automated System to Monitor and Restrict Honking (S) is then enabled for honking only after further recharge. Said system (S) has provisions for additional usage of honks in a partial enabled state wherein the honking in said partial enable state is done with long pressing of horn switch and delayed response from the actuator element (NAc) on the on-board computing means (N) of the present system (S) placed in the user's vehicle. Wherein further said partial enable state is an indication of allowable horn counts are over and only pre fixed additional horn counts are available after which system is to turn to disable state.

The present invention restricts the honking in an automobile is independent of automobile's location.

Present Automated System to Monitor and Restrict Honking (S) mainly comprises of:
  On-board computing means (N); and
  Off-board computing means (F).
wherein said on-board computing means (N) is placed on the vehicle and off-board computing means (F) and its components control and restrict honking away from the vehicle through a centralised system.

The present Automated System to Monitor and Restrict Honking (S) has provisions of continuous log management at centralised system enabling continuous observance of behaviour of honking of particular vehicle, particular area or state enabling government to frame or reframe the laws or amend them in accordance of the need. This is enabled by pushing log of each such device or an on-board computing means (N) installed in each vehicle, every time it is connected to the off-board computing means (F) of the present system (F). Also, a provision of validity is provided in the present system (S) which requires said connection between said on-board computing means (N) and said off-board computing means (F) at least after a pre-fixed period of time. If not connected by said pre-fixed time, said on-board computing means (N) shall no more remain active and the honking shall be disabled or restricted.

Referring to FIG. 1, the present Automated System to Monitor and Restrict Honking (S) mainly comprises of:
  On-board computing means (N); and
  Off-board computing means (F).
  Wherein:
  Said on-board computing means (N) is a device provided on the vehicle for real time honking detection, honk counting, storage and honk control. Said on-board computing means (N) is placed either
    1) Inside the Fuse Box: where vehicles have fuse box and supports the on-board computing means (N) to be connected directly replacing the horn relay, or
    2) Near the Battery where the on-board computing means (N) can receive power from vehicle battery and also having safe mounting place near battery. Said vehicles can be equipped with the on-board computing means (N) of the present Automated System to Monitor and Restrict Honking (S) fitted near battery, or
    3) On the Horn terminal where the on-board computing means (N) of the present Automated System to Monitor and Restrict Honking (S) can be wired and fitted on the horn.

Said Off-board computing means (F) is the means provided for processing and controlling the off-board functions of the present Automated System to Monitor and Restrict Honking (S) i.e. functions not to be performed on the vehicle for honking restriction, but away from the vehicle through a central system enabling centralised control system for restricting honking and thereby the noise pollution according to the judicial provisions of a state and/or a country. Said functions of present off-board computing means (F) include:
  Registering each new on-board computing means (N) installed in a vehicle;
  Configuration of said on-board computing means (N) with pre-set timings and set values defined by law enforcement authorities for pre-determined allowable honk counts and pre-determined time for which said set of allowable counts can be used;
  After said pre-determined time said pre-determined allowable horn counts shall be reset;
  authenticating the user of the present system (S);
  obtaining and maintaining the log of devices of the on-board computing means (N) installed for various users, along with the log of data of honk counts from each of such installed on-board computing means (N);
  updating the user with used honk counts by one's on-board computing means (N) and alerting the user when the allowable honk counts are over;
  enabling recharging of said on-board computing means (N) through its components;
  displaying.
Said on-board computing means (N) further comprises mainly of:
  a power management element (NPo),
  an actuation element (NAc),
  a feedback element (NFe),
  a processing element (NPr),
  a storage element (NSt),
  a real time clock (NRe), and
  A communication element (NCo).

Said off-board computing means (F) comprises of:
   User Element (FU),
   Dealer Element (FD), and
   Master Element (FM).

Wherein said power management element (NPo) is provided for management of the power required by the present on-board computing means (N) for performing its functions i.e. real time honking detection, honk counting, storage and honk control. Said power management element (NPo) takes power from vehicle battery and converts the 12V DC power coming from vehicle battery in to 5V DC required for present on-board computing means (N) for performing its functions.

Said actuation element (NAc) is a relay device through which on-board computing means (N) operates the vehicle horn. Said actuation element (NAc) is a 12 V DC Operated Device. The circuitry of said actuation element (NAc) has inbuilt sensing element that senses the horn blown actually by the command of the on-board computing means (N).

Said feedback element (NFe) is an optically isolated device for sensing horn switch status; which senses the 12 DC power coming from horn switch and converts it to stable digital signal for further processing.

Said storage element (NSt) interfaces with said processing element (NPr) and is used to store configuration data, status of the system, no of used honks and log of the use of horns. Said storage element (NSt) of a capacity of pre-decided value is placed in the present Automated System to Monitor and Restrict Honking (S) enabling it to store the above mention data of at least a pre-decided time period. Said storage element (NSt) is capable of storing data of validity period defined by judicial provisions of a state or a country and other configurations are used. In one of the preferred embodiments of the present Automated System to Monitor and Restrict Honking (S), said storage element (NSt) of 16K size which is capable of storing data of 6 months period and other configurations is used.

Said real time clock (NRe) provides real time, to be synchronized with various processes within the system occurring as a result of functioning of present Automated System to Monitor and Restrict Honking (S) and thereby enabling maintenance of real time log of the activities of the user of the present Automated System to Monitor and Restrict Honking (S). Said log of the activities include log of recharge validity, number of recharge, usage of honks. Said real time clock (NRe) uses said power management element (NPo) for getting the power for its functioning whenever external power supply is not available; which means when the vehicle battery is removed for maintenance or repair or service purpose the device keeps the timings set by the system till the battery is connected again.

Said processing element (NPr) processes all the functions of said on-board computing means (N). Said processing of functions includes:
   operating horn via actuation element (NAc),
   sensing horn signal coming from said feedback element (NFe);
   checking the state of the device (enable, disable or partially enable) continuously,
   allowing honking only in enabled state and long press honking in partial enable state;
   updating the state of the device (enable, disable or partially enable) continuously,
   continuously checks for Horn Status Reset Duration;
   starts incremental horn counting when feedback element (NFe) is pressed for the time longer than long press hold time;
   multiplies horn counts when multiple honking detected;
   disabling the horn or not allowing said on-board computing means (N) to honk when said on-board computing means (N) is in disable state;
   relating real time clock (NRe) and afore mentioned functions of said on-board computing means (N) every time said on-board computing means (N) is operated;
   transferring and storing the log of timing and usage of horns of respective on-board computing means (N) in said storage element (NSt).

wherein:
   the state of the device includes: enabled, partially enabled and disabled; the Horn Status Reset Duration is the pre-defined duration for which set of allowable number of horns are provided to every vehicle or an on-board computing means (N); after every said pre-defined duration (example 24 hours) new set of allowable number of horns is available with each such vehicle or an on-board computing means (N); or the horn counts are reset after said pre-defined duration to reset the horn status to enable; after which the horns shall be freshly counted for allowable number of horns;
   said long press time is the time for which, if said feedback element (NFe) is pressed, the horn count shall be incremented by one; and if said feedback element (NFe) is pressed for the longer time, the horn count shall be further be incrementally counted;
   said multiple honking is when the feedback element (NFe) is pressed for multiple times for short durations repeatedly, the horn counts are multiplied with the multiplication factor;

Said communication element (NCo) is for communication of on-board computing mean (N) with said dealer element (FD) and said user element (FU) of said off-board computing means (F) for the purposes of:
   updating horn counts to the off-board computing means (F) via dealer element (FD) or user element (FU);
   pushing log to the off-board computing means (F) via dealer element (FD) or user element (FU);
   receiving configuration from the off-board computing means (F) via dealer element (FD) or user element (FU);

wherein said communication element (NCo) uses wireless communication protocol to communicate with off-board computing means (F). Wherein further, communication occurs in form of communication packets making the system hackproof.

Said Off-board computing means (F) further comprises of:
   User Element (FU),
   Dealer Element (FD), and
   Master Element (FM).

Said User element (FU) is a computing device or an element connectable to said centralised system for various activities including registration, configuration, recharge and others for his on-board computing means (N) installed or in-built in his vehicle(s); said user element (FU) further comprises of:
   a user registration and authentication element (FURA),
   a user recharge means (FUR),
   a user Display means (FUD),
   a user means for pushing Log (FUL),
   a user communication element 1 (FUCL 1),
   a user communication element 2 (FUCL 2).

Said user registration and authentication element (FURA) checks and authenticates user registration and configuration data and provides data which needs to configuration of said on-board computing means (N). Said data of user and dealer and the configurations are retrieved from said master storage means (FMS) through master processing means (FMP).

Said user recharge means (FUR) is for recharge by user for his on-board computing means (N) to get pre-fixed number of honks (say 100) for his use after his allowable number of honks is used. For example, if allowable number of honks per 24 hours (one day is 100) and he is about to complete the use of these 100 honks or has already used them, he gets his on-board computing means (N) recharged for another set of honks. In a preferred embodiment, a user recharges for another set of allowable number of honks. In other embodiments, said recharge can be for varied number of honks). Said user recharge means (FUR) enables recharging the user's on-board computing means (N) through on-line payment modes. Alternatively, said User gets it recharges through dealer wherein the dealer recharges said dealer recharge means (FDR) which functions as described herein below.

Said user Display means (FUD) is for displaying the results of the activities within said user element (FU). Said user Display means (FUD) also facilitates for selection of particular on-board computing means (N) for pairing of said user element (FU) with said on-board computing means (N) for further processing.

Said user means for pushing Log (FUL) is for pushing all the data related to paired on-board computing means (N) to the master storage element (FMS) after processing through master processing means (FMP). Said data related to paired on-board computing means (N) is obtained by user communication element 1 (FUC1) from said paired on-board computing means (N) and is pushed to master element (FM) by said user means for pushing Log (FDL) via user communication element 2 (FUC2) and master communication element (FMC) to be stored in the master storage element (FMS). Said data related to paired on-board computing means (N) is the data of usage of honks per fixed period of time. In a preferred embodiment, said data is data of 6 months relating to number of honks used by said on-board computing means (N) per day. This also includes the data related to needless honking.

Said Dealer Element (FD) is an element or a computing device with the dealer. Said dealer is a person or an agency for installing, configuring and recharging (if and when required by user) the device in the user's vehicle, replacing the device and resetting the configurations (if and when required by user). Said dealer element (FD) further comprises of:
 a dealer registration and configuration means (FDRC),
 a dealer recharge means (FDR),
 a dealer display means (FDD),
 a dealer means for pushing Log (FDL),
 a dealer communication element 1 (FDC1),
 a dealer communication element 2 (FDC 2).

Said dealer registration and configuration means (FDRC) updates the updated configuration of an on-board computing means (N) through master processing means (FMS) by communication through said master communication means (FMS) and said communication means of the dealer (FDC1 and FDC2) and on-board communication means (NCo). Said dealer registration and configuration means (FDRC) also checks and authenticates user and configuration data and provides data which needs to configuration of said on-board computing means (N). Said data of user and dealer and the configurations are retrieved from said master storage means (FMS) through master processing means (FMP).

Said dealer recharge means (FDR) further comprises of a wallet means and payment means for recharge. Wherein recharge is done to enable the honking through on-board computing means (N) which gets restricted or disabled or partially disabled after use of allowable number of honks. Said allowable number of honks per on-board computing means (N) shall include pre-set values including values defined by the judicial provisions of a state. Said dealer recharge means (FDR) enables:
 reviewing of recharge history retrieved from said master storage means (FMS) through master processing means (FMP) by communicating through said master communication element (FMC);
 enables recharging wallet means using master processing means (FMP) vide communications between said dealer communication element 2 (FDC2) and master communication element (FMC);
 enables recharging of an on-board computing means (N) using master processing means (FMP) vide communications between said dealer communication element 2 (FDC2) and master communication element (FMC);
Said details are maintained as log in said master storage means (FMS) after being processed through said master processing means (FMP).

Said dealer Display means (FDD) is for displaying the results of the activities within said dealer element (FD) which includes logs, recharge history and updates, pairing options with on-board computing means (N). Said dealer Display means (FDD) also allows selection for pairing of said dealer element (FD) with a particular on-board computing means (N) for further processing.

Said dealer means for pushing Log (FDL) is for pushing all the data related to paired on-board computing means (N) to the master storage element (FMS) after processing through master processing means (FMP). Said data related to paired on-board computing means (N) is obtained by dealer communication element 1 (FDC1) from said paired on-board computing means (N) and is pushed to master element (FM) by said dealer means for pushing Log (FDL) via dealer communication element 2 (FDC2) and master communication element (FMC) to be stored in the master storage element (FMS). Said data related to paired on-board computing means (N) is the data of usage of honks per fixed period of time. In a preferred embodiment, said data is data of 6 months relating to number of honks used by said on-board computing means (N) per day. This also includes the data related to needless honking.

Said master element (FM) is a centralised computing device or an element provided for central storage, processing and control of the present Automated System to Monitor and Restrict Honking (S). Said element (FM) supports users and dealers for activities and functionalities relevant to present Automated System to Monitor and Restrict Honking (S). Said master Element (FM) includes central systems such as server. Said master element (FM) further comprises of:
 a master storage element (FMS),
 a master communication element (FMC),
 a master processing element (FMP), and
 a master display element (FMD).

Said master storage element (FMS) is for storage of details of User, dealer, recharges, devices, configurations and the logs. Said data is accessible to said user element (FU) as well as said dealer element (FD) for retrieving different details which are provided through said master communication means (FMC) to said user element (FU) or said dealer element (FD) through their respective communication means (FUC2 or FDC2).

Said master communication element (FMC) is provided for the communication between said master element (FM)

said user element (FU) or said dealer element (FD) through their respective communication means (FUC2 or FDC2) for processing the data of said user element (FU) or said dealer element (FD) at master processing means (FMP) and/or storing data at master storage element (FMS).

Said master processing element (FMP) is provided for processing the data or the information received from said user element (FU) or said dealer element (FD) for processing and/or for storage in said master storage means (FMS); and for providing the data/information from said master storage means (FMS) to said user element (FU) or said dealer element (FD) for various activities by user and the dealer including reviewing logs, updating configuration, registration and authentication.

Said master display element (FMD) is provided to display the data. Said data includes commands or requests for data from said user element (FU) or said dealer element (FD) and/or the processed data which further includes the logs, on-board device information, users, dealers and dealers' registrations.

Figure 2A:
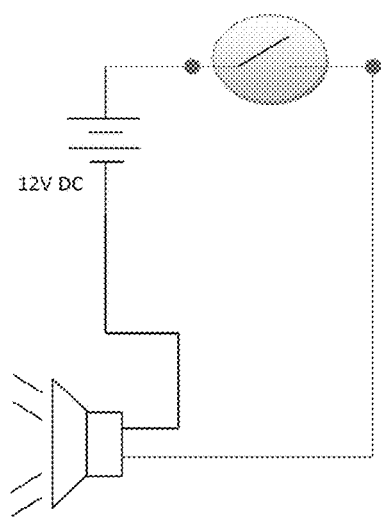
FIG. 2A: Shows the electric wiring of the Horn in the existing systems with common earth type wiring.
Figure 2B:
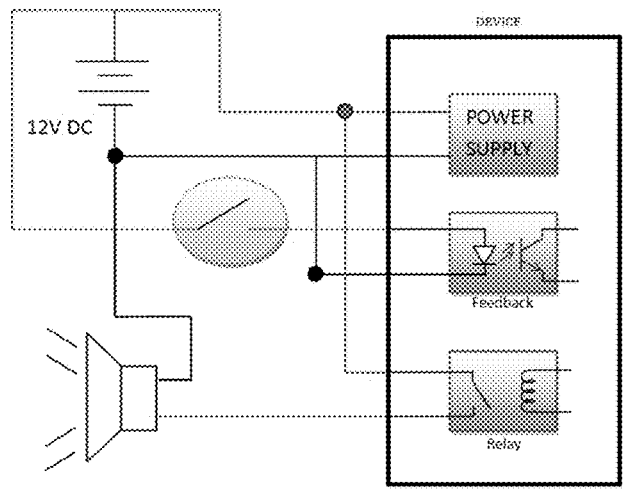
FIG. 2B: Shows the electric wiring of the Horn in the present Automated System to Monitor and Restrict Honking with common earth type wiring.
Figure 2C:
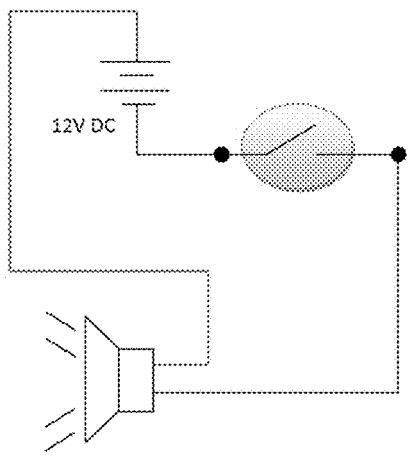
FIG. 2C: Shows the electric wiring of the Horn in the existing systems with common supply type wiring.
Figure 2D:
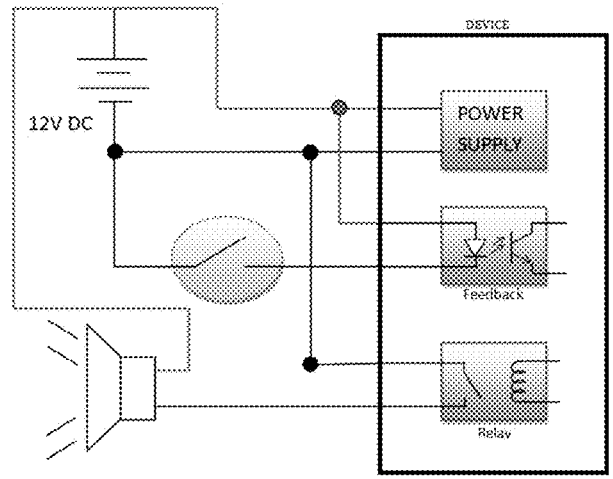
FIG. 2D: Shows the electric wiring of the Horn in the present Automated System to Monitor and Restrict Honking with common supply type wiring.

Referring to FIG. 2, shows the electric wiring of the Horn wherein FIG. 2A shows the electric wiring of the Horn in the existing systems with common earth type wiring; FIG. 2B Shows the electric wiring of the Horn in the present Automated System to Monitor and Restrict Honking (S) with common earth type wiring; FIG. 2C Shows the electric wiring of the Horn in the existing systems with common supply type wiring; and FIG. 2D Shows the electric wiring of the Horn in the present Automated System to Monitor and Restrict Honking (S) with common supply type wiring. In view of the FIG. 2A, 2B, 2C and FIG. 2D; in order to install the present Automated System to Monitor and Restrict Honking (S), the wiring of the existing systems as shown in FIGS. 2A and 2C wherein the horn is directly connected to the switch; is to be changed to the wiring as shown in FIG. 2B and FIG. 2D respectively, wherein the vehicle horn switch is disconnected from horn and is connected to the feedback element (NFe) via horn switch terminal of the on-board computing means (N). The horn is then connected the actuation element (NAc) via horn terminal of the on-board computing means (N). The necessary looping is done for common earth type vehicle wiring or common supply type vehicle wiring. The elements of on-board computing means (N) are flexible to support all the wiring systems for all types of vehicles.

This wiring system for the installation of present Automated System to Monitor and Restrict Honking (S) along with the component parts of the present system (S) described herein above makes the system tamper proof and hack proof. Since every on-board computing means (N) is registered and configured and the log of each such on-board computing means (N) is stored in the master element (FM), any tempering is traced. Moreover, any duplicate device cannot be registered on present system (S) ensuring authenticated working of present system (S). In the following ways the tempering is traced:

If the device is sealed, it shall be deactivated and disabled for honking once the validity is over. In addition, tempering to the sealing damages the device.

If the communication element (NCo) is tampered on the on-board computing means (N), its communication is via defined off-board communication means (FUC and FUD) of the off-board computing means (F) which has all the details of each such on-board computing means (N) stored in said master storage (FMS) ensuring communication with correct on-board computing means (N). Thus, any tempering via communication means (NCo) is easily detected.

If the device wiring is tempered, by disconnecting the power, there is no communication of said on-board computing means (N) with the off-board communication means (F) resulting in inactivation of on-board computing means (N) after said pre-fixed time is over or the validity period is over.

Even if the power is not tampered but the horn wiring is bypassed, so as not to count honking; then said on-board computing means (N) senses the same through inbuilt feedback of actuation element (NAc) while the feedback element (NFe) is pressed for honking. Said on-board computing means (N) thus senses that horn is blown even if the processing element (NPr) of on-board computing means (N) has not generated the command for the same and Horn is not blown when the processing element (NPr) of the on-board computing means (N) has generated the command to do so. Said misactivity is registered in on-board computing means (N) in its storage element (NSt) and is further communicated to off-board computing means (F) when the log is pushed to said off-board computing means (F) thus tracing the tempered device.

Figure 3A:
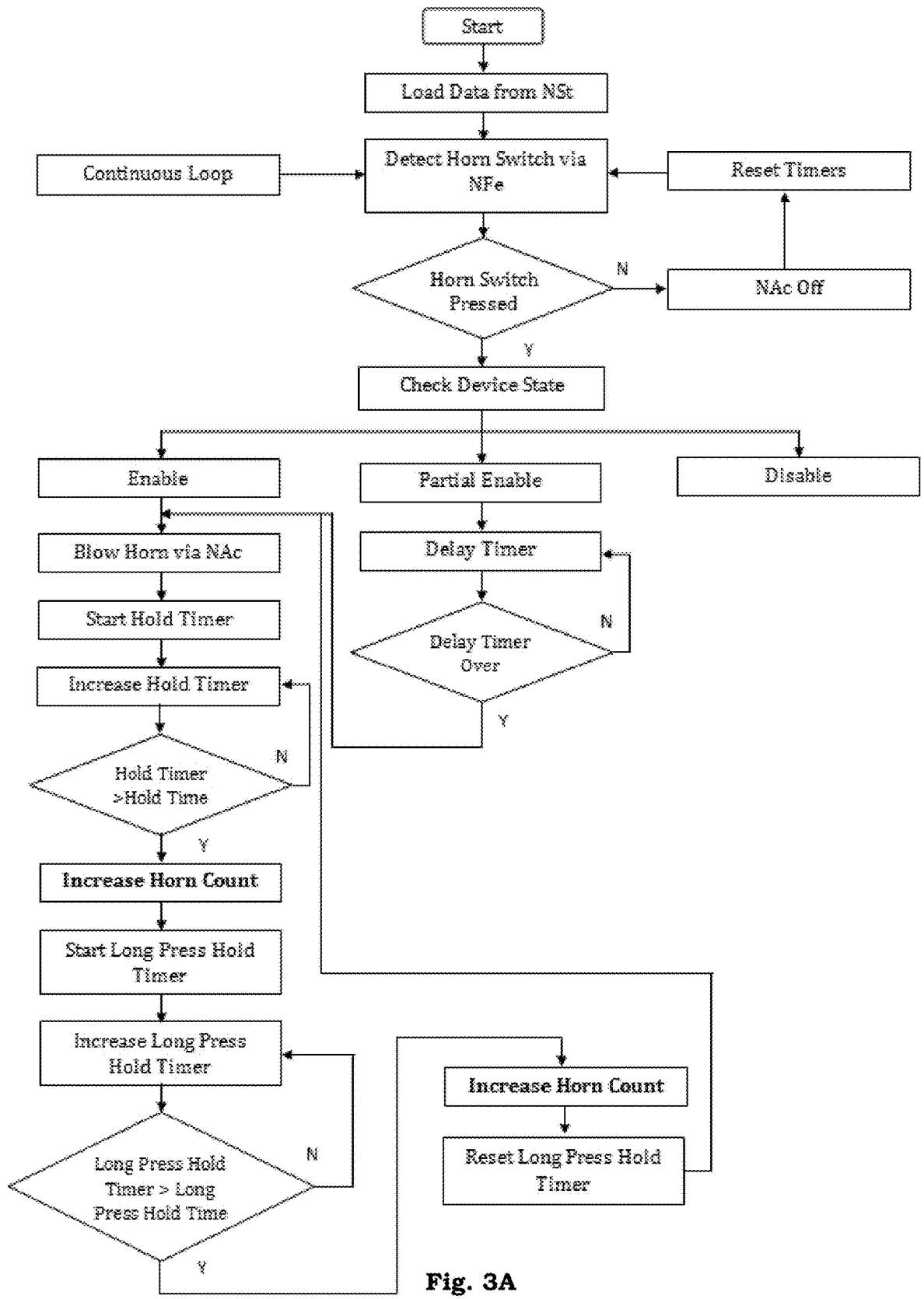
FIG. 3A: Shows the flowchart of the Honk counting in the present Automated System to Monitor and Restrict Honking.

Referring to FIG. 3 which shows various flow charts of various functions and its operation of the on-board computing means (N) wherein FIG. 3A shows the flowchart of the Honk counting in the present Automated System to Monitor and Restrict Honking (S) wherein its shows that when the present system (S) is turned ON; it loads the data or the details of the honk counts (honk used) from the storage element (NSt) of the on-board computing means (N). When said feedback element (NFe) is pressed, said processing element (NPr) checks the status of the on-board computing means (N) to confirm the Enable or partial enable or disable state of the on-board computing means (N). The on-board computing means (N) restricts further honking, if the state is disabled. The processing element (NPr) once in disable state does not allow actuation element (NAc) to blow horn even if the horn switch or the feedback element (NFe) is pressed. When the state is partial enable, said processing element (NPr) allows the honking through delay counter wherein said actuation element (NAc) is pressed, it results in delayed honking. When the allowable delayed horns are also exhausted or delay count is over, processing element (NPr) changes the state to the Disable state from partial enable state. When the status is enabled through a recharge after the disable or partial disable state or is already in enable state, when the horn switch is pressed, the feedback element (NFe) senses the same and the processing element (NPr) adds to the honk counts on each such feedback from said feedback element (NFe) and the number of honks used shall be increased in the log maintained for the on-board computing means (N) of the respective vehicle and shall be stored in the storage element (NSt) of said on-board computing means (N). When the feedback element (NFe) is kept pressed for a longer time for blowing continuous horn; the honk counts shall increase and shall be reflected in the log and stored in said storage element (NSt) with said increased count. Said longer time is pre-set to restrict such continuous honking; and when the feedback element (NFe) is pressed for more than said pre-set time, then the increased delay counting starts and honk counts are rapidly increased as per pre-set values. Said pre-set values are number of honks set to be considered to be blown when said feedback element (NFe) is pressed for a time longer than a pre-set time.

Figure 3B:
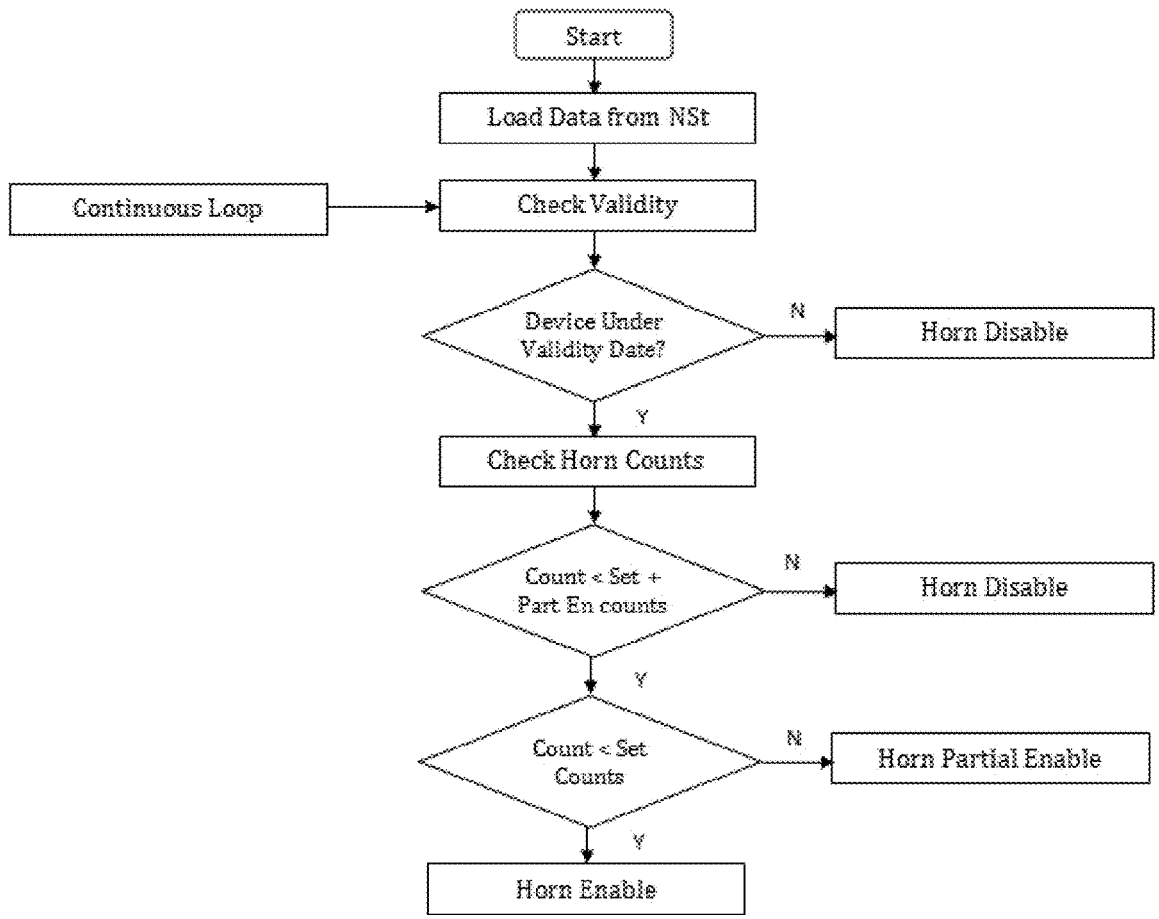
FIG. 3B: Shows the flowchart of the Honk status in the present Automated System to Monitor and Restrict Honking.

FIG. 3B Shows the flowchart of the Honk status in the present Automated System to Monitor and Restrict Honking (S) wherein, it shows that when the present is turned ON through the On-board computing means (N), it loads the configuration, status and horn count data from the Storage means (NSt) to check the validity of the on-board computing means (N). When said on-board computing means (N) is under validity, it checks the horn counts and if it is not under the validity dates, it restricts or disables the honking. When the horn counts are checked, if the available horn counts of enable state along with available horn counts of the partial enable state are consumed, processing element (NPr) shall be in disable state and shall not allow the horn to blow. When the value of horn count is at pre-set value for partial enable state, it partially enable the horn and allow honking only after long press; and if the horn count is less than the allowable value, it keeps the on-board computing means (N) to enable state and allow normal honking till the pre-set value is reached.

Figure 3C:
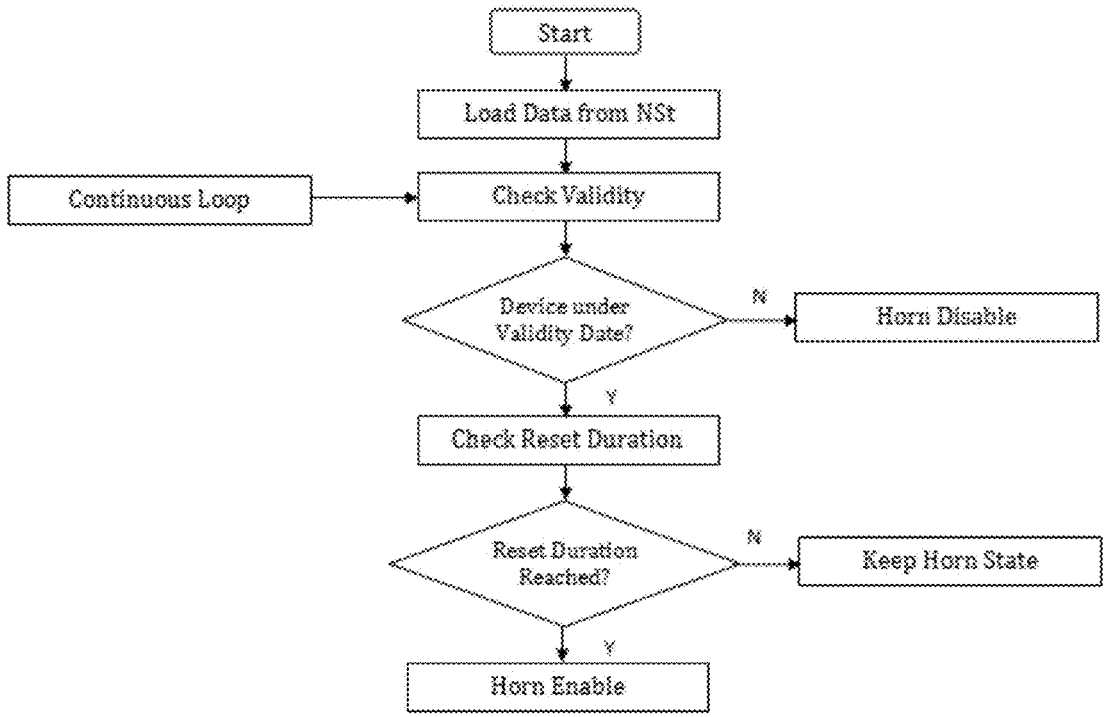
FIG. 3C: Shows the flowchart of the Honk status reset in the present Automated System to Monitor and Restrict Honking.

FIG. 3C Shows the flowchart of the Honk status reset duration in the present Automated System to Monitor and Restrict Honking (S) wherein it shows that when the present is turned ON through the On-board computing means (N), it loads the configuration, status and horn count data from the Storage means (NSt) to check the validity of the on-board computing means (N). When said on-board computing means (N) is under validity, if it is not under the validity dates, it restricts or disables the honking. When reset duration is reached, processing element (NPr) resets the horn counts and updates the on-board computing means (N) in enable state.

Figure 3D:
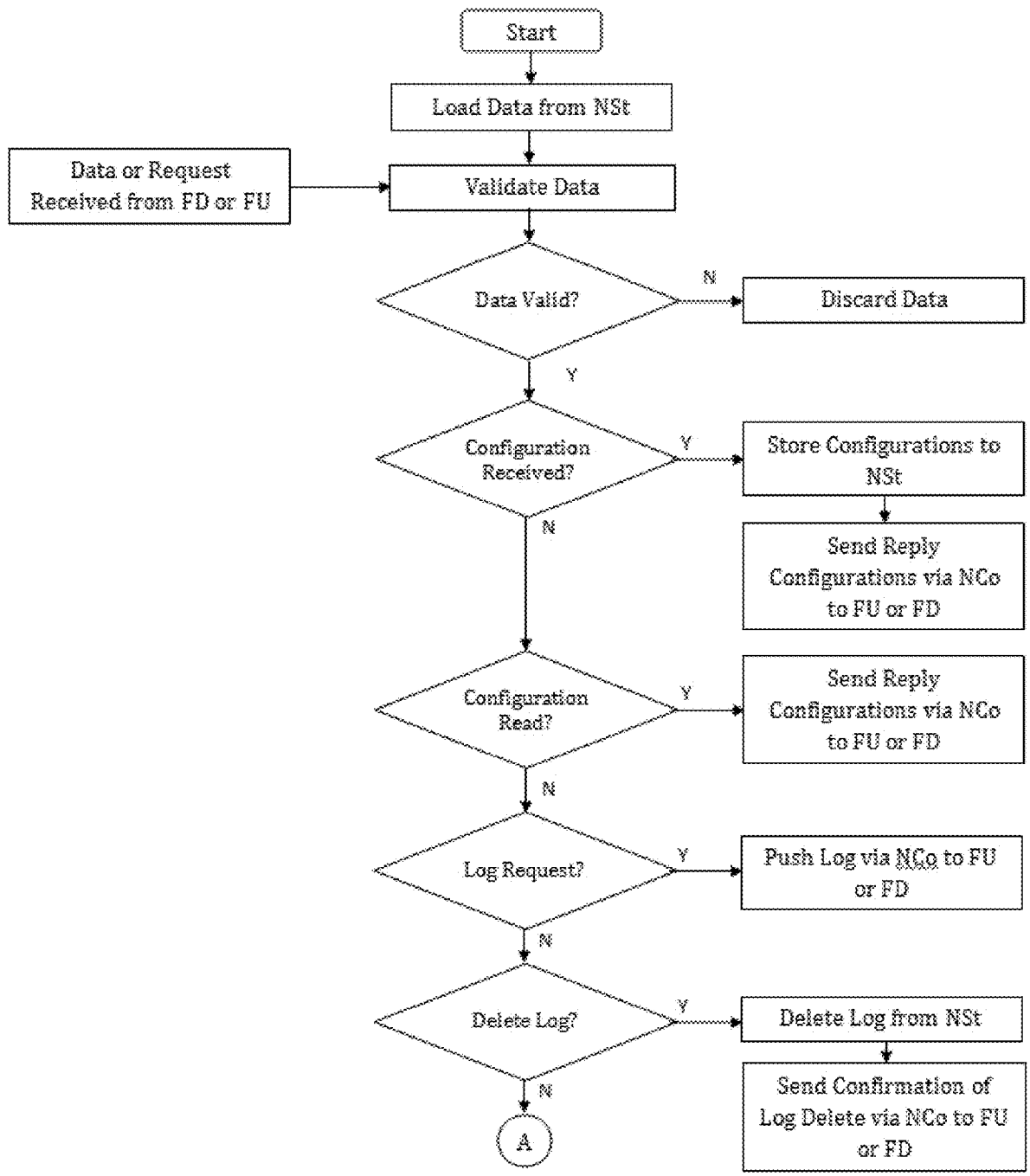
Figure 3D:
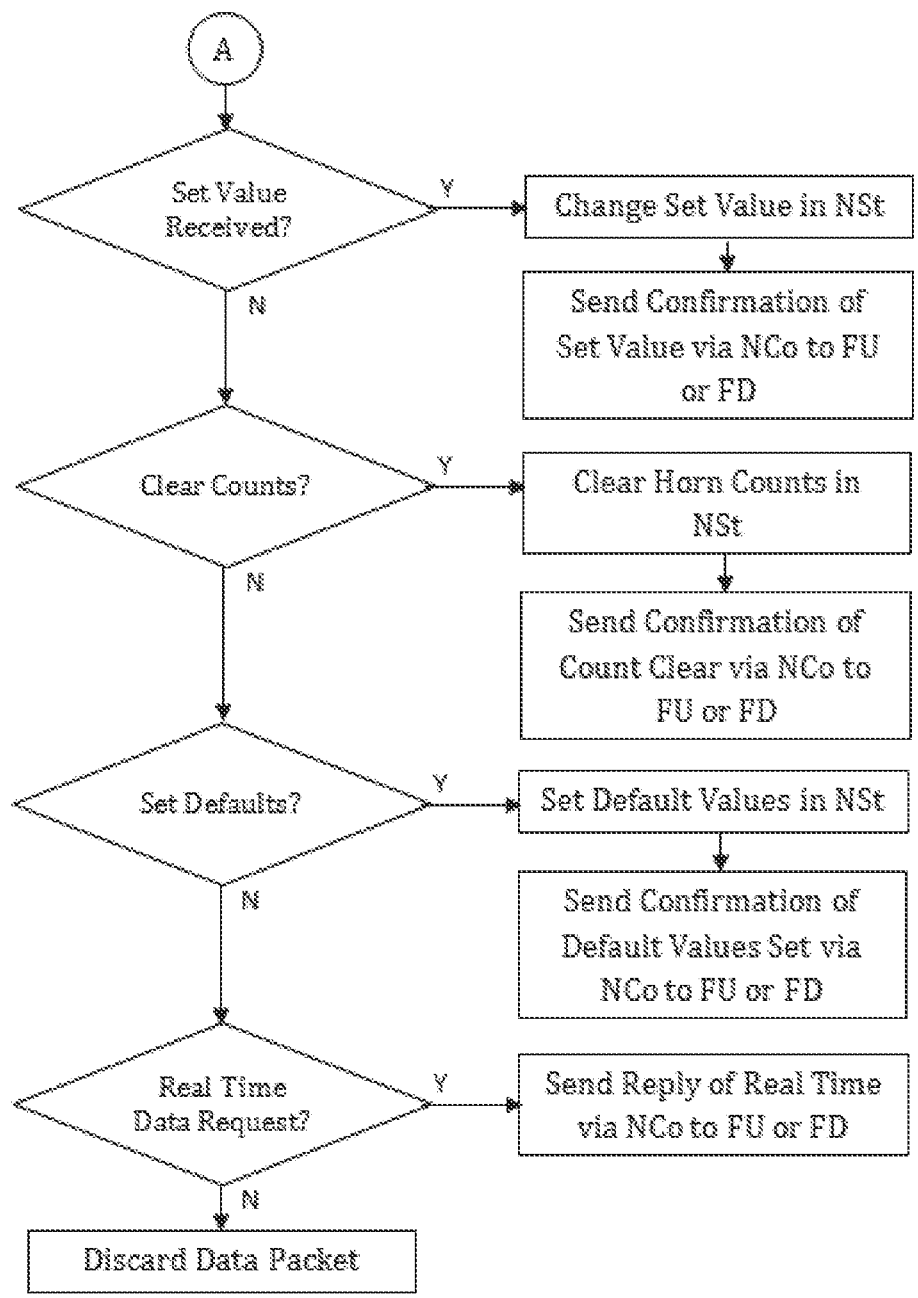

FIG. 3D Shows the Communication flowchart for the present Automated System to Monitor and Restrict Honking (S) wherein it shows that when the present is turned ON through the On-board computing means (N), it loads the configuration, status and horn count data from the Storage means (NSt) to check the validity of the on-board computing means (N). When said on-board computing means (N) is under validity, it checks for the data or the request received from said dealer element (FD) or the User element (FU). Wherein, when said data received is configuration, said configuration is saved in the storage element (NSt) and a reply is sent to said dealer element (FD) or the User element (FU) for receiving the data through said communication element (NCo). Also, when the request is to read configuration, said configuration is sent from the on-board computing means (N) to said dealer element (FD) or the User element (FU) through said communication element (NCo). When a log request is received, the log is pushed through said communication means (NCo) to said dealer element (FD) or the User element (FU) which is further pushed to the master element (FM) and is stored in said master storage means (FMS) (see FIG. 1). Each time the log is pushed from storage element (NSt) said on-board computing means (N) to said dealer element (FD) or the User element (FU), request for deleting the log is received and the log is deleted from on-board computing means (N). When the set vales are received, they are updated or changes in said storage element (NSt) and the confirmation for the same is sent to said dealer element (FD) or the User element (FU). If the request for clearing counts is received, said counts are cleared in said storage means (NSt) and confirmation for the same is sent to said dealer element (FD) or the User element (FU). Such requests for clearing counts is made in situations including emergencies and alike. When request for setting default is received, said defaults are stored in said storage means (NSt) and the confirmation of the same is sent to said dealer element (FD) or the User element (FU) through said communication means (NCo). When a request for real time data is received, said real time data is sent to said dealer element (FD) or the User element (FU) through said communication means (NCo). If there request received is not from any of above mentioned, said data is discarded.

Referring to FIG. 4 shows flowchart showing working of user element (FU) of the off-board computing means (F) of the present Automated System to Monitor and Restrict Honking (S) which shows that when the user starts his user element (FU), he connects the on-board computing means (N) with the user element (FU). Said connection is achieved by blue tooth pairing and alike. The user element (FU) then authenticates said on-board computing means (N) via user registration and authentication element (FURA); failing which said user element (FU) communicates with the Master Storage element (FMS) of off-board computing means (F) for authentication using the data stored therein; through master processing element (FMP). Once the authentication is done, the log stored in the storage element (NSt) of said on-board computing means (N) pushes the log of data to the user means for pushing log (FUL). Said log is further pushed to the master communication element (FMC) through User communication element 2 (FUC2) and is then processed by said master processing means (FMP) to be stored in said master storage element (FMS). The user reviews the recharge history on the user display means (FUD) of said user element (FU) wherein the data is retrieved from said master storage element (FMS) through master communication element (FMC). When the user wants to recharge, it is done using master processing means (FMP) through wallet means of the dealer recharge means (FDR) of said dealer element (FD) and the updated set of honk counts is stored in said master storage element (FMS). Further, said user element (FU) sends said updated data of new set of honk counts through communication element (NCo) to the processing means (NPr) which updates the counter and said data is then stored in said storage element (NSt) of said on-board computing means (N). Recharge is also done by user recharge means (FUR) through online payment means (not shown in the flow chart).

Figure 4A:
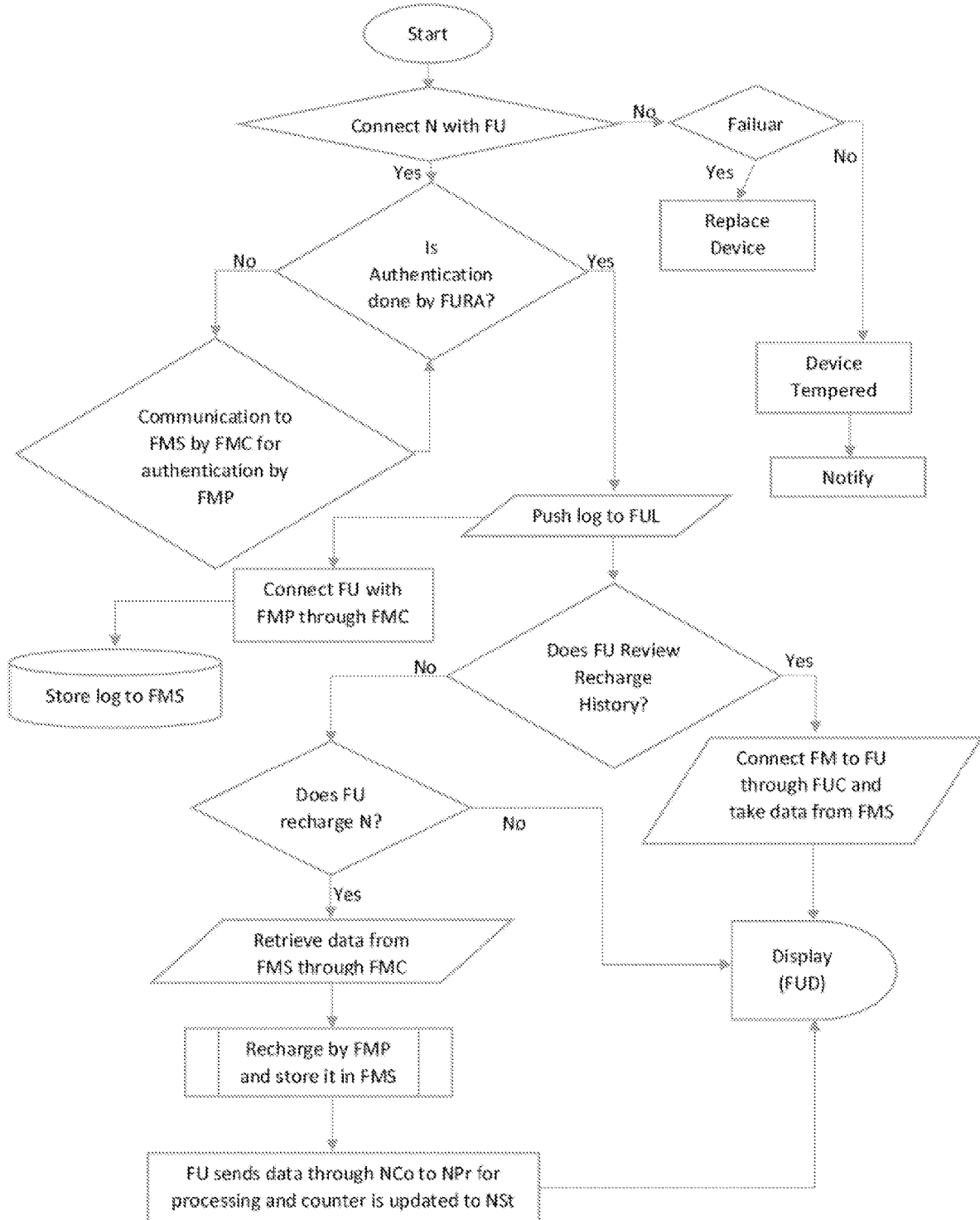
FIG. 4A: Flowchart showing working of user element of the off-board computing means of the present Automated System to Monitor and Restrict Honking.
Figure 4B:
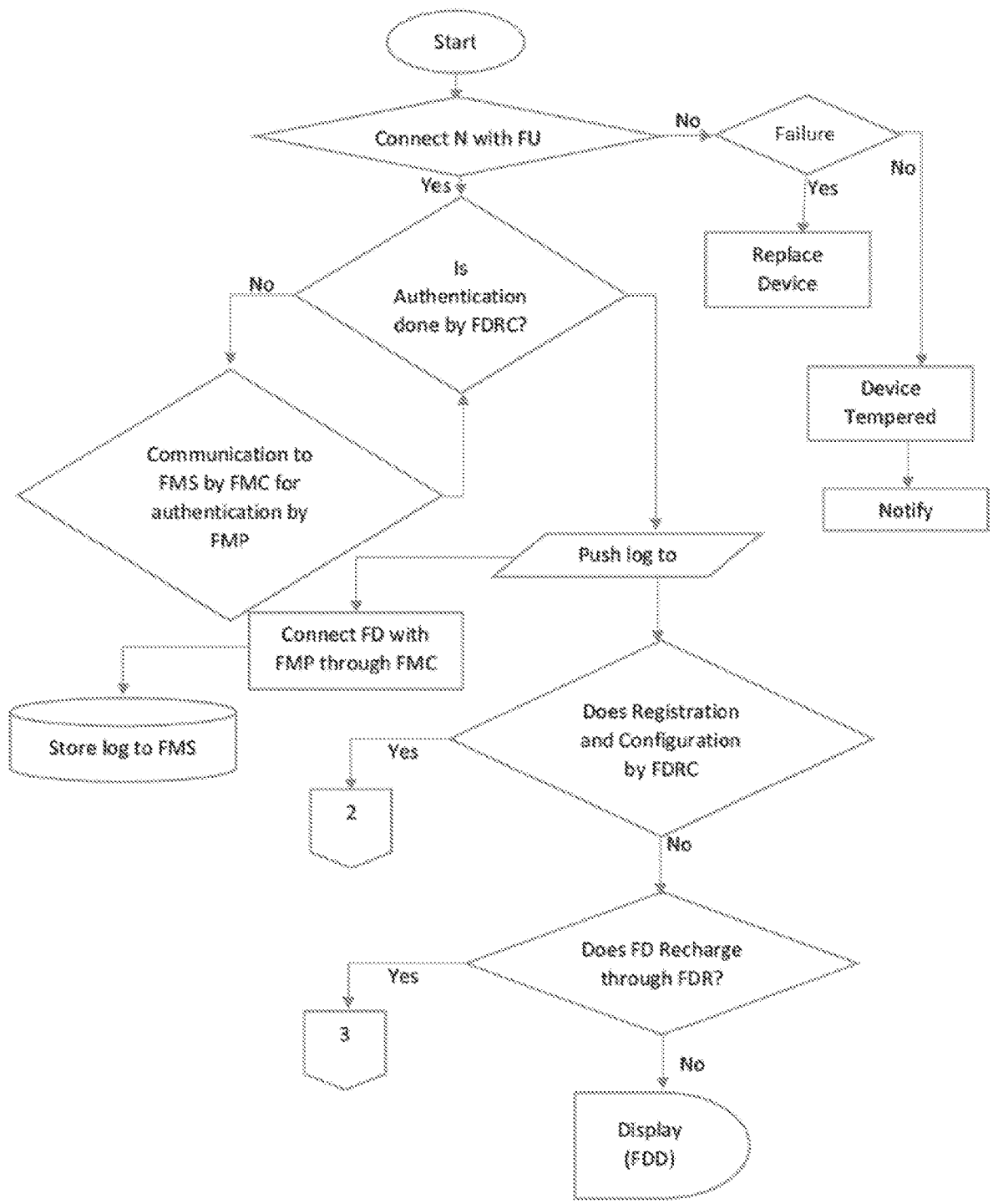
FIG. 4B: Flowchart showing working of dealer element of the off-board computing means of the present Automated System to Monitor and Restrict Honking.
Figure 4B:
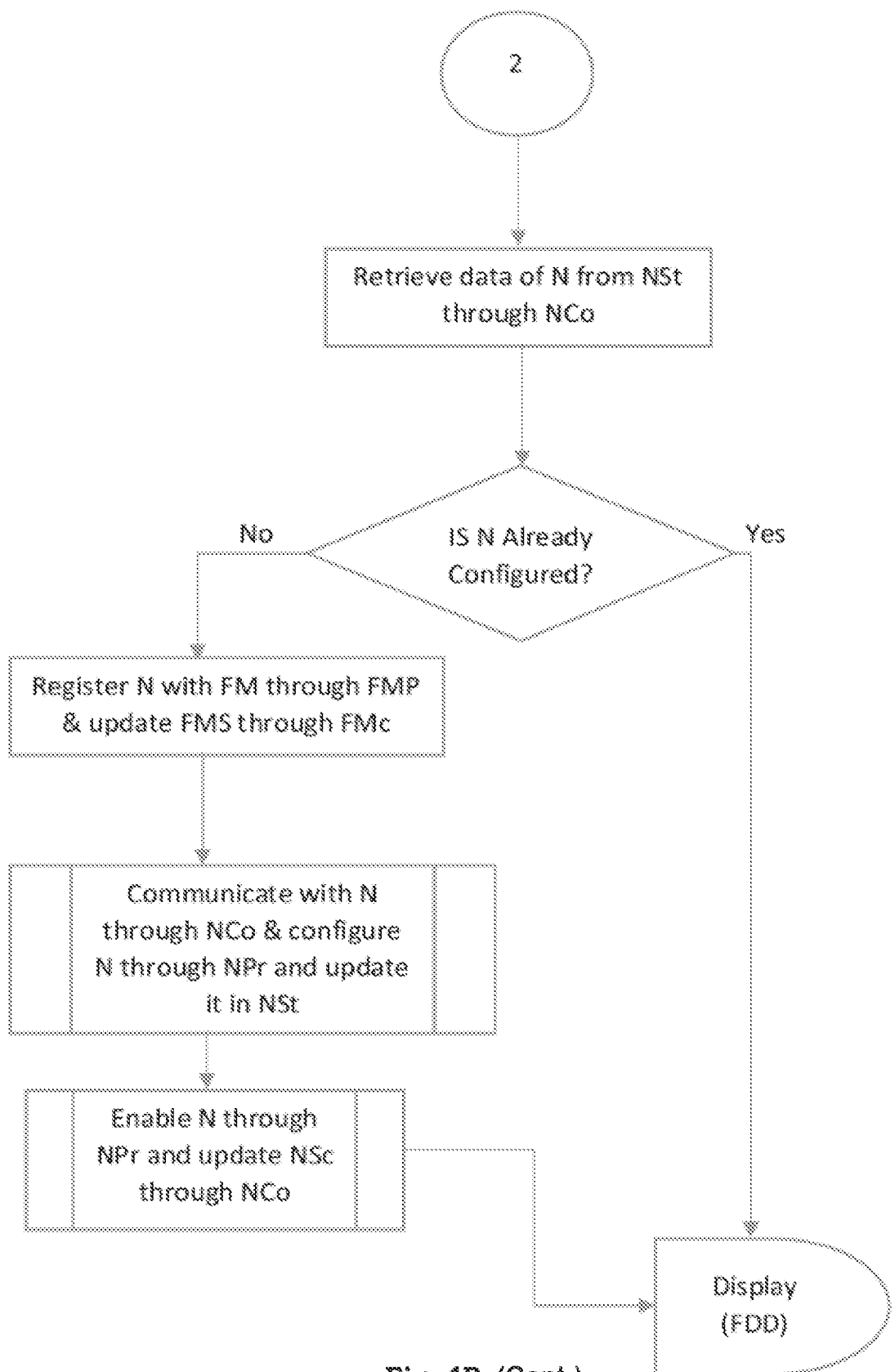
Figure 4B:
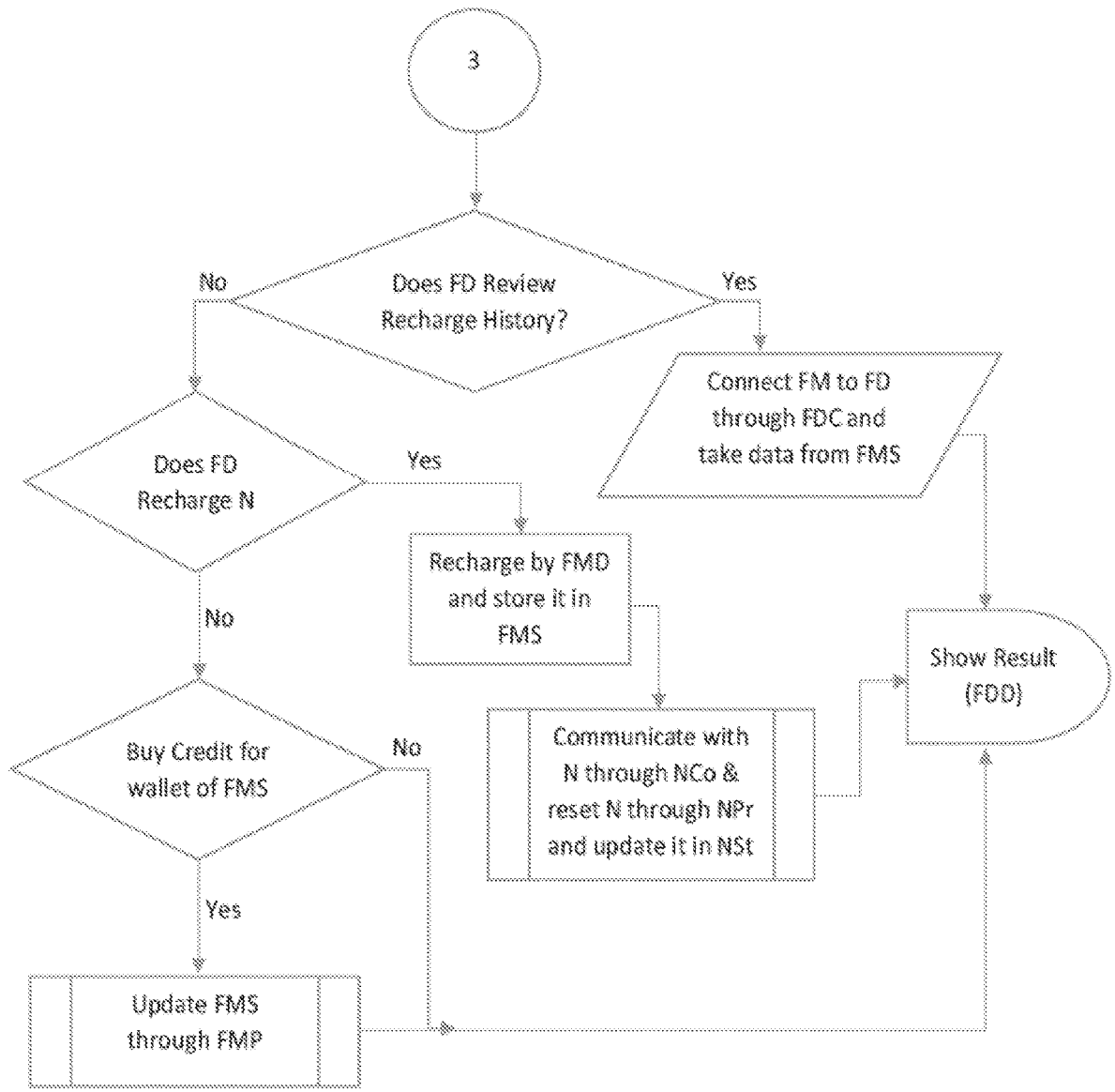

Referring to FIG. 4B shows flowchart showing working of dealer element (FD) of the off-board computing means (F) of the present Automated System to Monitor and Restrict Honking (S) which shows that when the dealer starts his dealer element (FD), he connects the on-board computing means (N) with the dealer element (FD). Said connection is achieved by blue tooth pairing and alike. The dealer element (FD) then authenticates said on-board computing means (N) via dealer registration and configuration means (FDRC); failing which said dealer element (FD) communicates with the Master Storage element (FMS) of off-board computing means (F) for authentication using the data stored therein; through master processing element (FMP). Once the authentication is done, the log stored in the storage element (NSt) of said on-board computing means (N) pushes the log of data to the dealer means for pushing log (FDL). Said log is further pushed to the master communication element (FMC) through Dealer communication element 2 (FDC2) and is then processed by said master processing means (FMP) to be stored in said master storage element (FMS). Further, the dealer element (FD), through its dealer registration and configuration means (FDRC), checks whether the on-board computing means (N) is registered and configured or not wherein the data is retrieved from said storage element (NSt) through communication element (NCo). If the on-board computing means (N) is not configured, the dealer registers the on-board computing means (N) with the master element (FM) of the off-board computing means (F) through the master processing element (FMP) and updates the master storage means (FMS) through the master communication element (FMC). Same is communicated to the on-board computing means (N) through the communication element (NCo) of the on-board computing means (N) and configure said on-board computing means (N) through the on-board processing means (NPr) and updates the same in the on-board storage element (NSt). This enables the on-board computing means (N) through the on-board processing element (NPr) and updates the on-board storage element (NSt) through said on-board communication element (NCo). This update is seen on the dealer display means (FDD). When the user wants to recharge through a dealer, it is done using master processing means (FMC) and the updated set of honk counts is stored in said master storage element (FMS). Further, said dealer element (FD) sends said updated data of new set of honk counts through communication element (NCo) to the processing means (NPr) which updates the counter and said data is then stored in said storage element (NSt) of said on-board computing means (N). This update is seen on the dealer display means (FDD). Further, when the dealer wants to review the recharge for any particular on-board computing means (N), the data is retrieved from said master storage element (FMS) through master communication element (FMC) and dealer communication element (FDC). Same is seen on the dealer display means (FDD). When the dealer wants to buy credits for the wallet, it is done through the dealer recharge means (FDR) and updates the recharged value to the master storage element (FMS) through master processing element (FMP). The update is also seen on the dealer display means (FDD).

Figure 4C:
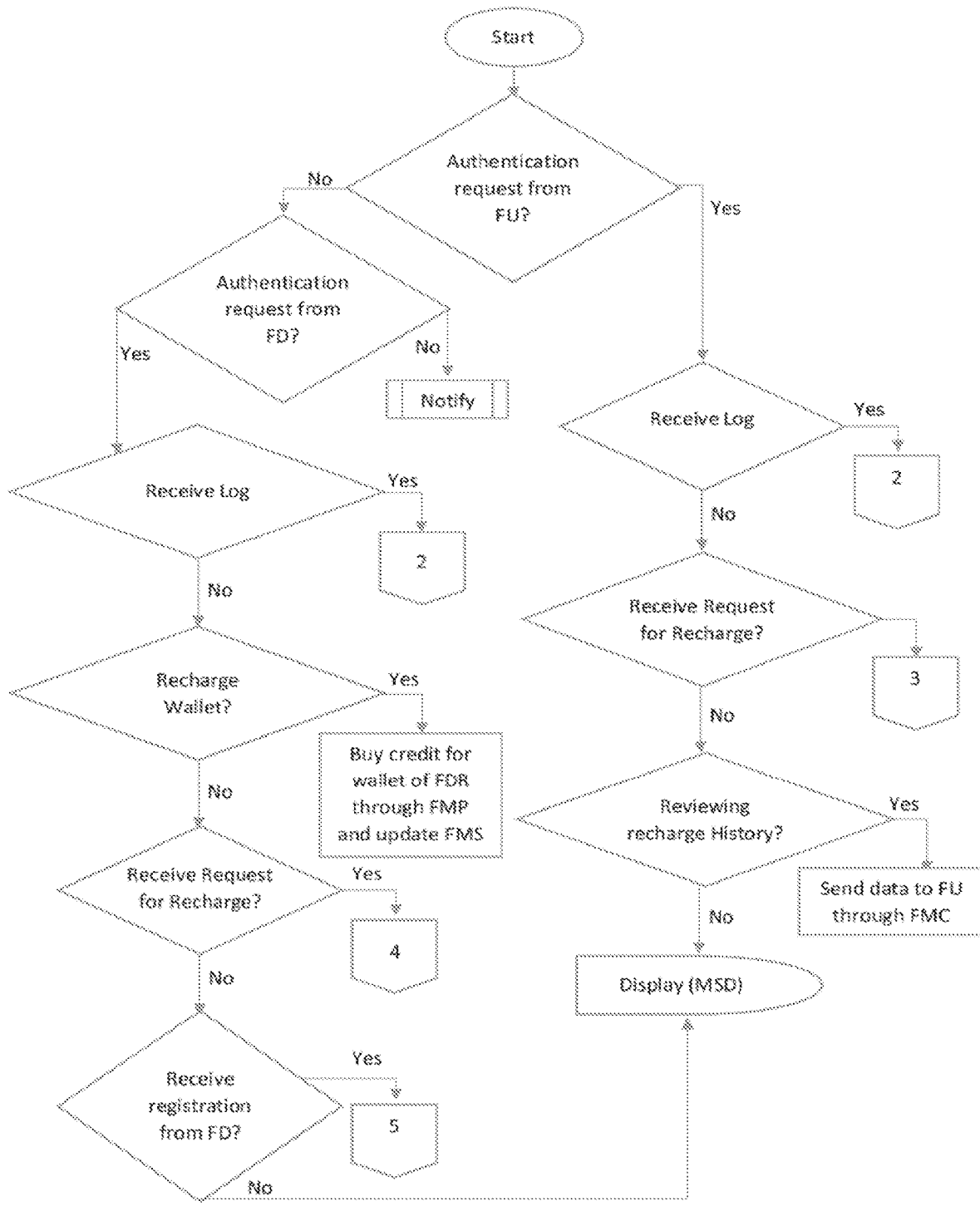
Figure 4C:
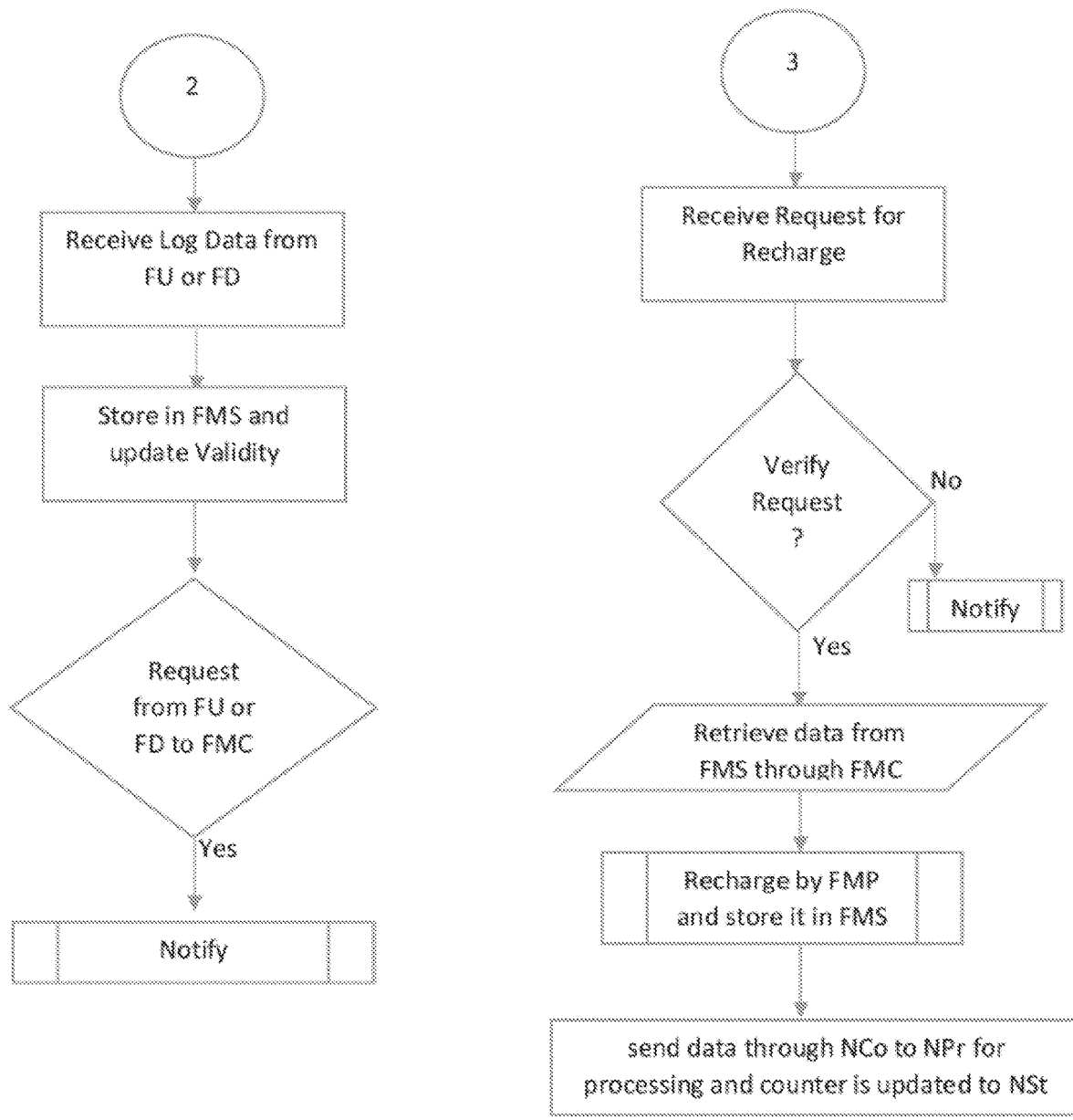
Figure 4C:
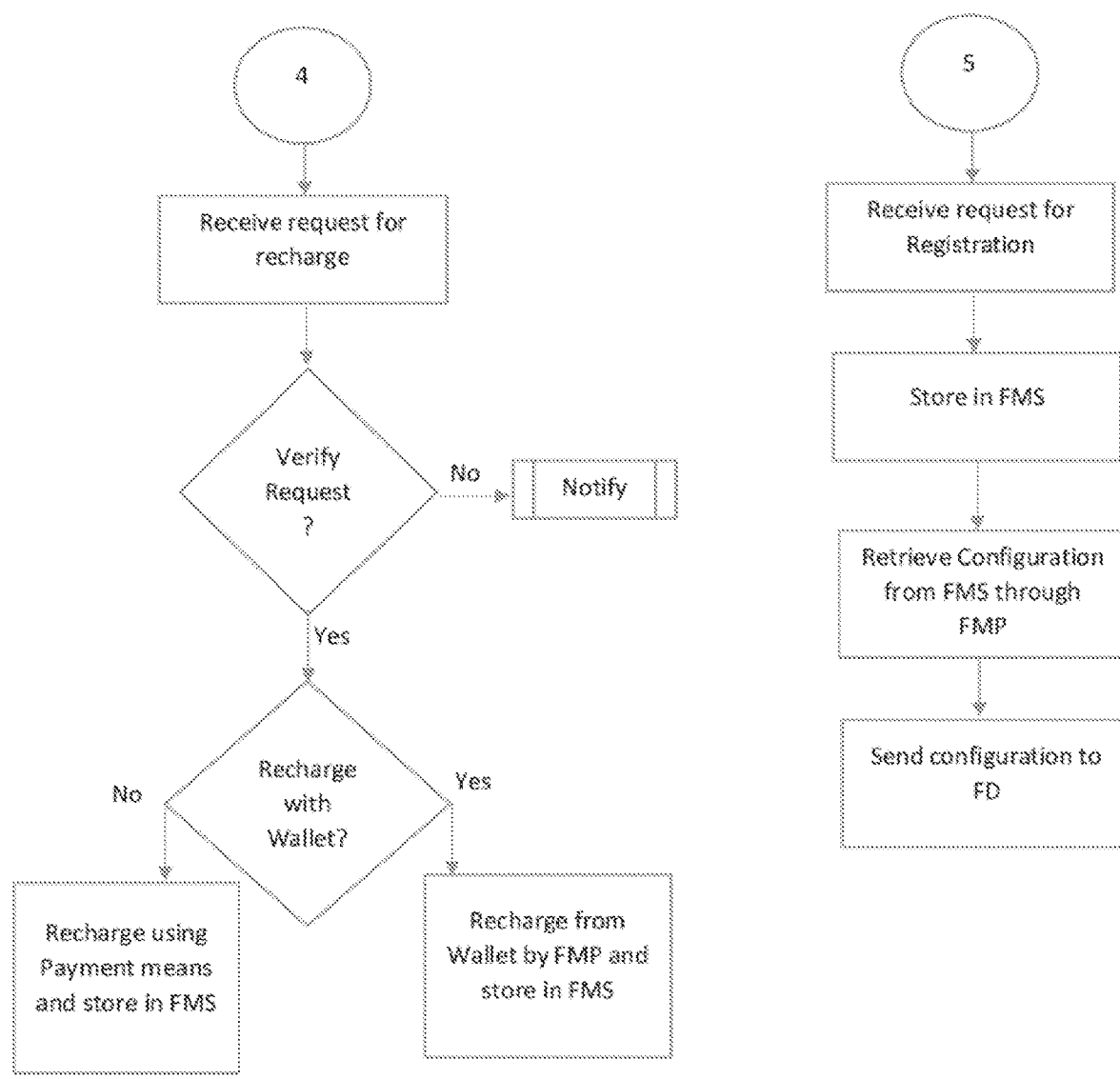

Referring to FIG. 4C shows flowchart showing working of master element (FM) of the off-board computing means (F) of the present Automated System to Monitor and Restrict Honking (S) which shows that when an authentication request is received by said master element (FM) from said user element (FU) and is authenticated by said master element (FM), it receives log from said dealer element (FD) or the User element (FU), it is stored in said master storage means (FMS) and the validity is updated and is notified to said User element (FU) through said master communication means (FMC). Further, when request for recharge is received from said User element (FU), said request is verified for eligibility according to the configurations. Said eligibility is dependent on number of allowable recharges. If said number of allowable recharges are exceeded, it is not verified and is notified to said user element (FU) on its display means (FUD). Whereas if allowable number of recharges is not exceeded, said recharge is allowed; for which the data is retrieved from said master storage means (FMS) through said communication means (FMC). Recharge is then done by said master processing means (FMP) through payment means that includes online payment; and is stored in said master storage element (FMS).

Said data is sent for processing to said on-board processing means (NPr) through said communication element (NCo) and the Storage element (NSt) is updated for the same. If a request for reviewing the recharge history is received. Said data is sent to said user element (FU) through said communication means (FMC). The results are displayed on user element display means (FUD).

When the authentication request is received from said dealer element (FD), in case of failure of notification, it is notified to said dealer element (FD), whereas when the authentication is done, it receives log from said dealer element (FD) which is the stored in said master storage means (FMS). Further, when a request for recharge is received, said request is verified for eligibility according to the configurations. Said eligibility is dependent on number of allowable recharges. If said number of allowable recharges are exceeded, it is not verified and is notified to said dealer element (FD) on its display means (FDD). Whereas if allowable number of recharges is not exceeded, said recharge is allowed; for which the data is retrieved from said master storage means (FMS) through said communication means (FMC). Recharge is then done by said master processing means (FMP) through payment means that includes online payment; Said data is sent for processing to said on-board processing means (NPr) through said communication element (NCo) and the Storage element (NSt) is updated for the same. Recharge is also done from the wallet of said dealer element (FD) through master processing means (FMP) and the same is stored in master storage means (FMS).

When a request for recharging the wallet is received by said master element (FM) from said dealer element (FD), it buys credit for dealer recharge means (FDR) through master processing means (FMP) and online modes for buying wallet credits. It is the updated in said master storage means (FMS).

When said master element (FM) receives registration from said dealer element, it stores the same in said master storage element (FMS). It then retrieves configuration from said master storage element (FMS) through master processing element (FMP) and said configurations are sent to said dealer element (FD). The results are displayed on dealer element display element (FDD).

Working of the Invention:
1. A new on-board computing means (N) is installed in existing vehicle or a new vehicle with present on-board computing means (N) is bought; wherein said on-board computing means (N) is placed either in Inside the Fuse Box or Near the Battery or On the Horn terminal or is OEM (Original Equipment Manufacturer).
2. Said on-board computing means (N) is turned ON and is paired with the off-board computing means (F) of the dealer i.e. the dealer element (FD)
3. The dealer element (FD) then authenticates said on-board computing means (N) via dealer registration and configuration means (FDRC)
4. Once the authentication is done, the log stored in the storage element (NSt) of said on-board computing means (N) pushes the log of data to the dealer means for pushing log (FDL). Said log is further pushed to the master communication element (FMC) through Dealer communication element 2 (FDC2) and is then processed by said master processing means (FMP) to be stored in said master storage element (FMS).
5. The dealer registers the on-board computing means (N) with the master element (FM) of the off-board computing means (F) through the master processing element (FMP) and updates the master storage means (FMS) through the master communication element (FMC). Same is communicated to the on-board computing means (N) through the communication element (NCo) of the on-board computing means (N) and configure said on-board computing means (N) through the on-board processing means (NPr) and updates the same in the on-board storage element (NSt). This enables the on-board computing means (N) through the on-board processing element (NPr) and updates the on-board storage element (NSt) through said on-board communication element (NCo) which allows honking through on-board computing means (N).

6. Detect horn switch pressed via Feedback Element (NFe) by vehicle driver. When said feedback element (NFe) is pressed, said processing element (NPr) checks the status of the on-board computing means (N) to confirm the Enable or partial enable or disable state of the on-board computing means (N). The on-board computing means (N) restricts further honking, if the state is disabled. The processing element (NPr) once in disable state does not allow actuation element (NAc) to blow horn even if the horn switch or the feedback element (NFe) is pressed. When the state is partial enable, said processing element (NPr) allows the honking through delay counter wherein said actuation element (NAc) is pressed, it results in delayed honking. When the allowable delayed horns are also exhausted or delay count is over, processing element (NPr) changes the state to the Disable state from partial enable state. The examples and its explanation is given the examples provided herein after.

7. User recharges in any state of the on-board computing means (N). When the user wants to recharge, it is done using online payment method via master processing means (FMP) through user recharge means (FUR) of said user element (FU) and the updated set of honk counts is stored in said master storage element (FMS). Further, said user element (FU) sends said updated data of new set of honk counts through communication element (NCo) to the processing means (NPr) which updates the counter and said data is then stored in said storage element (NSt) of said on-board computing means (N).

8. When the user wants to recharge through a dealer, it is done using master processing means (FMP) and the updated set of honk counts is stored in said master storage element (FMS). Further, said dealer element (FD) sends said updated data of new set of honk counts through communication element (NCo) to the processing means (NPr) which updates the counter and said data is then stored in said storage element (NSt) of said on-board computing means (N). This update is seen on the dealer display means (FDD). Further, when the dealer wants to review the recharge for any particular on-board computing means (N), the data is retrieved from said master storage element (FMS) through master communication element (FMC) and dealer communication element (FDC). Same is seen on the dealer display means (FDD). When the dealer wants to buy credits for the wallet, it is done through the dealer recharge means (FDR) and updates the recharged value to the master storage element (FMS) through master processing element (FMP). The update is also seen on the dealer display means (FDD).

9. When reset duration is reached, processing element (NPr) resets the horn counts and updates the on-board computing means (N) in enable state.

10. Each time the on-board computing means (N) communicates with user Element (FU) or dealer element (FD); log stored in the storage element (NSt) of said on-board computing means (N) is pushed to the user means of pushing log (FUL) or dealer means for pushing log (FDL). Said log is further pushed to the master communication element (FMC) through Dealer communication element 2 (FDC2) and is then processed by said master processing means (FMP) to be stored in said master storage element (FMS).

11. Once Master Element (FM) receives log from said dealer element (FD) or the User element (FU), it is stored in said master storage means (FMS) and the validity is updated and is notified to on-board computing means (N) via said User element (FU) or Dealer element (FD) through said master communication means (FMC). Further, when request for recharge is received from said User element (FU), said request is verified for eligibility according to the configurations. Said eligibility is dependent on number of allowable recharges. If said number of allowable recharges are exceeded, it is not verified and is notified to said user element (FU) on its display means (FUD). Whereas if allowable number of recharges is not exceeded, said recharge is allowed; for which the data is retrieved from said master storage means (FMS) through said communication means (FMC). Recharge is then done by said master processing means (FMP) through payment means that includes online payment; and is stored in said master storage means (FMS). Said data is sent for processing to said on-board processing means (NPr) through said communication element (NCo) and the storage element (NSt) is updated for the same. If a request for reviewing the recharge history is received. Said data is sent to said user element (FU) through said communication means (FMC). The results are displayed on user display means (FUD).

12. If on-board computing means (N) do not comes in communication with master element (FM) via user element (FU) or dealer element (FD) for validity period, the processing element (NPr) considers the on-board computing means (N) as not active. Horn cannot blow if the on-board computing means (N) is not active. If the on-board computing means (N) communicates with the master element (FM) via user element (FU) or dealer element (FD), it receives updated validity and changes state to active.

Conditions for Working of Invention for Restriction of Needless Honking:

1. The conditions for working of honk counts showing the restriction of continuous honking is shown in the below table wherein the table shows the conditions for enable state as well as partial enable state. When a user tries to continuously honk, his allowable honk counts shall be exhausted rapidly as countinous honk amounts to multiple honk counts as described herein below:

TABLE 1 shows the working when horn switch is long pressed and sensed via feedback element (NFe).

| Sr no | Horn Count Condition | Effect on Horn Count |
|---|---|---|
| A | ENABLE STATE | |
| 1 | Hold Timer < Hold Time | Horn Count = Horn Count |
| 2 | Hold Timer > Hold Time | Horn Count = Horn Count + 1 |
| 3 | Long Press Hold Timer > Long Press Hold Time | Horn Count = Horn Count + 1 Clear Long Press Hold Timer and Again Start Clear Long Press Hold Timer |
| B | PARTIAL ENABLE STATE | |
| 1 | Delay Timer < Delay Time | Horn Actuator OFF |
| 2 | Delay Timer > Delay Time | Horn Actuator ON |
| 3 | Hold Timer < Hold Time | Horn Count = Horn Count |
| 4 | Hold Timer > Hold Time | Horn Count = Horn Count + 1 |
| 5 | Long Press Hold Timer > Long Press Hold Time | Horn Count = Horn Count + 1 Clear Long Press Hold Timer and Again Start Clear Long Press Hold Timer |

According to table 1, when the on-board computing means (N) is in enable state; a pre-fixed time is set which is the Hold Timer as a reference for counting the horn counts.

When the hold time of a switch, while blowing a horn by the user is less than said Hold timer; there is no increase in the hold count. That is the hold count remains the same as earlier. Whereas when the hold time is higher than the hold time, the horn count is calculated as one and is counted as one horn count and is added to the earlier horn counts. In addition, when a user tries to continuously honk and presses the switch for a longer time for countinous honking; a long press timer, with a pre-fixed long press value is referenced and when the hold time of the switch is higher than said long press timer, the horn count increases by one after which addition of horn counts keeps repeating by clearing and restarting the long press timer.

While, when said on-board computing means (N) is in partial enable state, a delay timer is refrenced with a pre-fixed value; when the horn switch is pressed for a time less than said delay timer, no horn shall be blown. When horn switch pressed for a longer time than said delay timer, horn gets blown. At this stage, the hold timer is again referenced and the horn counts shall be calculated with reference to the hold timer as described herein above.

For example, when
Hold Timer=0.1 Sec, Long Press Hol Time=0.5 Sec and Delay Time=2 Sec

TABLE 2 shows the working example when horn switch is long pressed and sensed via feedback element (NFe).

| Sr no | Horn Count Condition | Effect on Horn Count |
|---|---|---|
| A | | ENABLE STATE |
| 1 | Hold Timer < 0.1 | Horn Count = Horn Count |
| 2 | Hold Timer > 0.1 | Horn Count = Horn Count + 1 |
| 3 | Long Press Hold Timer > 0.5 Sec | Horn Count = Horn Count + 1 Clear Long Press Hold Timer and Again Start Clear Long Press Hold Timer |
| B | | PARTIAL ENABLE STATE |
| 1 | Delay Timer < 2 Sec | Horn Actuator OFF |
| 2 | Delay Timer > 2 Sec | Horn Actuator ON |
| 3 | Hold Timer < 0.1 Sec | Horn Count = Horn Count |
| 4 | Hold Timer > 0.1 Sec | Horn Count = Horn Count + 1 |
| 5 | Long Press Hold Timer > 0.5 Sec | Horn Count = Horn Count + 1 Clear Long Press Hold Timer and Again Start Clear Long Press Hold Timer |

A case study with reference to above example is as shown under:
Case Study

| Horn Counts = 10 | |
|---|---|
| Horn Switch Pressed for 0.05 Sec | Horn Counts = 10 |
| Horn Switch Pressed for 0.2 Sec | Horn Counts = 11 |
| Horn Switch Pressed for 5 Sec | Horn Counts = 22 |
| Horn Switch Pressed for 0.45 Sec | Horn Counts = 23 |
| Horn Switch Pressed For 0.55 Sec | Horn Counts = 25 |
| Horn Switch Pressed For 1.1 Sec | Horn Counts = 28 |

2. The conditions for working of honk counts showing the restriction of multiple honking is shown in the below table wherein the table shows that when a user tries to honk for multiple times, his allowable honk counts shall be exhausted rapidly as multiple honks within pre-determined time shall amount to multiple honk counts multiplied by a value as described herein below that will multiply the honk counts as per the set value to rapidly exhaust the allowable honk counts:

TABLE 3 shows the working when horn switch is pressed multiple times and is sensed via feedback element (NFe).

| Sr no | Horn Count Condition | Effect on Horn Count |
|---|---|---|
| 1 | Horn Switch Pressed | Horn Count = Horn Count + 1 Start Multiple Honking Detection Timer |
| 2 | Multiple Honking Detection Timer > Multiple Honking Detection Period And Total Horn Counts increased in Multiple Honking Detection Period > Multiple Honking Set Honks | Horn Counts = Horn Counts Increased in Multiple Honking Detection Period * Multiplication Factor |

According to table 3, when horn switch is pressed, horn is blown and horn count is increased by one. However, when multiple horns are blown within a pre-fixed time i.e. Multiple Honking Detection Period, the horn counts increase by multiple of pre-fixed value known as multiplication factor. For the same Multiple Honking Detection Timer is set and if the Multiple Honking Detection Period is higher than said Multiple Honking Detection Timer and the number of horns blown is said period is higher than a pre-set honking numbers known as Multiple Honking Set Honks; then the horn counts rapidly increase to a value which is equal to Horn Counts Increased in Multiple Honking Detection Period*Multiplication Factor.

For example, when:
Multiple Honking Detection Period=10 Sec
Multiple Honking Set Honks=5
Multiplication Factor=2

TABLE 4 shows the working example when horn switch is pressed multiple times and is sensed via feedback element (NFe).

| Sr no | Horn Count Condition | Effect on Horn Count |
|---|---|---|
| 1 | Horn Switch Pressed | Horn Count = Horn Count + 1 Start Multiple Honking Detection Timer |
| 2 | Multiple Honking Detection Timer > 10 Sec And Total Horn Counts increased in Multiple Honking Detection Period > 5 | Horn Counts = Horn Counts Increased in Multiple Honkind Detection Period * 2 |

A case study with reference to above example is as shown under:
Case Study

| Time | Horn Counts = 10 | |
|---|---|---|
| Sec-0 | Horn Switch Pressed | Horn Counts = 11 |
| Sec-1 | Horn Switch Pressed | Horn Counts = 12 |
| Sec-3 | Horn Switch Pressed | Horn Counts = 13 |
| Sec-5 | Horn Switch Pressed | Horn Counts = 14 |
| Sec-7 | Horn Switch Pressed | Horn Counts = 15 |
| Sec-8 | Horn Switch Pressed | Horn Counts = 16 |
| Sec-10 | | Horn Counts = 22 |

ADVANTAGES OF THE PRESENT INVENTION

1. The present Automated System to Monitor and Restrict Honking facilitates to reduce noise pollution caused by automobile honking.
2. The present invention is based on pre-set permissible horn counts allowed as per the laws of the jurisdiction and disables the honking after pre-fixed repeated reminders.
3. The present system that:
   recognize needless honks,
   identify the offender who is or who has done needless honking,
   identify the repeater of needless honking
4. It is temper proof, hack-proof and corruption proof system of automobile noise control.
5. It enables effective implementation of honking restriction related laws.
6. It enables tracking & controlling honking without human interface making the present system corruption proof.
7. It enables data collection of honking for analysis thereby generating a complete log of data useful for tracing each such installed system and its behavior and also useful for making noise pollution control law more stringent & frame other law based on data.
8. It enables automatic and accurate identification (without human intervention) remotely by the system and thereby penalize only accurately identified errant automobile drivers; thereby facilitating the disciplining of behavior of general public with regards to honking.
9. It is easy to install in all types of existing automobile systems (including two wheelers) and also making it possible to provide as in-built system in future automobiles (OEM).
10. Said System has a provision for recharge, only for permissible times as per laws (preferably once).
11. Present system has provision of partial enable mode for use in emergency so that the purpose of providing horn is not defeated and user uses the horn in emergency.
12. Present system is free of maintenance and is economical.
13. Said System is easy (no special skills required to use the present system) and simple to use (provides flawless usage by user), yet is efficient.
14. The present invention is System to help Government raise money from culprit, for medical treatment of victim (patient) of noise pollution.

The invention claimed is:

1. An automatic honking restriction system (S) comprises of;
   a) an off-board computing means (F) for processing and controlling the off-board functions, further comprising:
      a Dealer Element (FD), for installing, configuring and re-configuring the automatic honking restriction system (S) to a pre-set values for allowable number of honks and configuring the horn switch status to enabled state, partially enabled state, and disabled state and pairing on-board computing means (N) for monitoring the horn usage;
      an User Element (FU), comprising a recharging means (FUR) for recharging on-board computing means (N) for a pre-fixed number of allowable number of honks for the automatic honking restriction system (S); and
      a Master Element (FM), is a centralized computing device for registration of the automatic honking restriction system (S), log management, authentication and communication,
   b) an on-board computing means (N) for real time honking count, storage and control, further comprising:
      a processing element (NPr) continuously checking state of the device, transferring log of timing and monitoring the usage of horns;
      an actuation element (NAc) acting as a relay device through which on-board computing means (N) operates the horn;
      a feedback element (NFe), for sensing horn switch status, checks the status of the on-board computing means (N) to confirm the enabled or partially enabled or disabled state of the on-board computing means (N);
      a real time clock (NRe) providing real time synchronization within the horn restriction system (S);
      a power management element (NPo) for power management; a storage element (NSt), for storing data of the on-board computing means (N); and
      a communication element (NCo) for communicating the on-board computing means (N); and
   the off-board computing means (F), wherein a Hold Timer provides a pre-fixed hold time as a reference for counting the pre-set values for allowable number of honks;
   the Hold Timer calculates the duration of a user horn and if the duration is less than said pre-fixed hold time, there is no decrease in the pre-set values for allowable number of honks and the horn count remains the same and when the hold time is higher than the pre-fixed hold time, the pre-set values for allowable number of honks is decreased by the duration of pre-fixed hold time;
   the Hold Timer decreases the pre-set values for allowable number of honks by multiplication factor when multiple horns are blown within a pre-fixed time;
   the processing element (NPr) changes the state of the system from enabled state to partially enabled state to disabled state as the allowable horn counts are being exhausted; and
   the processing element (NPr), operates horn via actuation element (NAc) checking the state of the device allowing honking only in enabled state and long press honking in the partially enabled state.

2. The automatic honking restriction system (S) as claimed in claim 1 wherein the Hold Time and the pre-set values for allowable number of honks is set in accordance with judicial provisions of a state.

3. The automatic honking restriction system (S) as claimed in claim 1 wherein the honking in said partially enabled state is done with long pressing of the horn and delayed response from the actuator element (NAc) on the on-board computing means (N) of the present system (S).

4. The automatic honking restriction system (S) as claimed in claim 1 wherein said partially enabled state acts as an indication that the allowable horn counts are over, and the system shall be disabled.

5. The automatic honking restriction system (S) as claimed in claim 1 wherein the real time clock (NRe) provides real time, to be synchronized with various processes within the system.

6. The automatic honking restriction system (S) as claimed in claim 1 wherein if the device wiring is tampered, by disconnected the power, there is no communication of said on-board computing means (N) with the off-board communication means (F) resulting in inactivation of on-board computing means after said pre-fixed time is over or the validity period is over.

* * * * *